US009292096B2

United States Patent
Watanabe et al.

(10) Patent No.: US 9,292,096 B2
(45) Date of Patent: Mar. 22, 2016

(54) CONFERENCE PROJECTION SYSTEM WITH GESTURE-BASED IMAGE TRANSMITTING UNIT

(71) Applicants: Ayako Watanabe, Kanagawa (JP); Shinichiro Sakamoto, Kanagawa (JP); Ryo Takemoto, Kanagawa (JP)

(72) Inventors: Ayako Watanabe, Kanagawa (JP); Shinichiro Sakamoto, Kanagawa (JP); Ryo Takemoto, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 316 days.

(21) Appl. No.: 13/917,879

(22) Filed: Jun. 14, 2013

(65) Prior Publication Data
US 2013/0335640 A1    Dec. 19, 2013

(30) Foreign Application Priority Data
Jun. 18, 2012   (JP) .................. 2012-137321

(51) Int. Cl.
G06F 3/01    (2006.01)
G06F 3/00    (2006.01)
G06F 3/02    (2006.01)
H04N 9/31    (2006.01)

(52) U.S. Cl.
CPC ............... *G06F 3/017* (2013.01); *G06F 3/005* (2013.01); *G06F 3/021* (2013.01); *H04N 9/3179* (2013.01)

(58) Field of Classification Search
CPC ........ G03B 21/00; G03B 21/14; G03B 33/10; H04N 9/31; H04N 9/3194; H04N 1/00381; G06K 9/00335; G06F 3/01; G06F 3/017; G06F 3/048; G06F 3/0488
See application file for complete search history.

(56) References Cited

U.S. PATENT DOCUMENTS

| 7,468,742 | B2 * | 12/2008 | Ahn et al. ................. 348/207.99 |
| 8,074,415 | B2 | 12/2011 | Terada et al. |
| 8,464,184 | B1 * | 6/2013 | Cook et al. ..................... 715/863 |
| 8,490,002 | B2 * | 7/2013 | Fai ......................... G06F 1/1639 345/173 |
| 8,651,666 | B2 * | 2/2014 | Huebner ........................... 353/28 |
| 8,896,578 | B2 * | 11/2014 | Kim et al. ...................... 345/179 |
| 8,964,298 | B2 * | 2/2015 | Haddick et al. ............... 359/630 |
| 2006/0158623 | A1 * | 7/2006 | Kobayashi et al. ............ 353/122 |
| 2007/0074906 | A1 * | 4/2007 | Tanaka .................. E04H 1/1272 174/480 |
| 2009/0063573 | A1 | 3/2009 | Takemoto |
| 2009/0237692 | A1 | 9/2009 | Endoh et al. |
| 2010/0207875 | A1 * | 8/2010 | Yeh ............................... 345/156 |

(Continued)

FOREIGN PATENT DOCUMENTS

| JP | 2006-146415 | 6/2006 |
| JP | 2007-072687 | 3/2007 |

*Primary Examiner* — Christina Riddle
*Assistant Examiner* — Christopher Lamb, II
(74) *Attorney, Agent, or Firm* — Oblon, McClelland, Maier & Neustadt, L.L.P.

(57) ABSTRACT

An information processing apparatus is connected to a projector that projects an image and a gesture recognizing device that recognizes a gesture by a person. The information processing apparatus includes a projection image transmitter that inputs a projection image to the projector; an image capturing device that captures, when the gesture recognizing device has recognized a gesture, a projection image being projected by the projector; a transmission destination determining device that determines a transmission destination address based on a gesture recognized by the gesture recognizing device; and a captured image transmitter that transmits a captured image captured by the image capturing device to a transmission destination address determined by the transmission destination determining device.

15 Claims, 20 Drawing Sheets

(56) References Cited

U.S. PATENT DOCUMENTS

| | | |
|---|---|---|
| 2011/0249019 A1* | 10/2011 | Chen ............................ 345/593 |
| 2011/0299108 A1 | 12/2011 | Nagao et al. |
| 2011/0310409 A1 | 12/2011 | Yukumoto et al. |
| 2011/0317223 A1 | 12/2011 | Nagao et al. |
| 2012/0017147 A1* | 1/2012 | Mark ............................ 715/702 |
| 2012/0133970 A1 | 5/2012 | Yukumoto et al. |
| 2012/0215828 A1 | 8/2012 | Torii et al. |
| 2013/0181905 A1* | 7/2013 | Chiang ........................ 345/168 |
| 2014/0176420 A1* | 6/2014 | Zhou et al. .................... 345/156 |

* cited by examiner

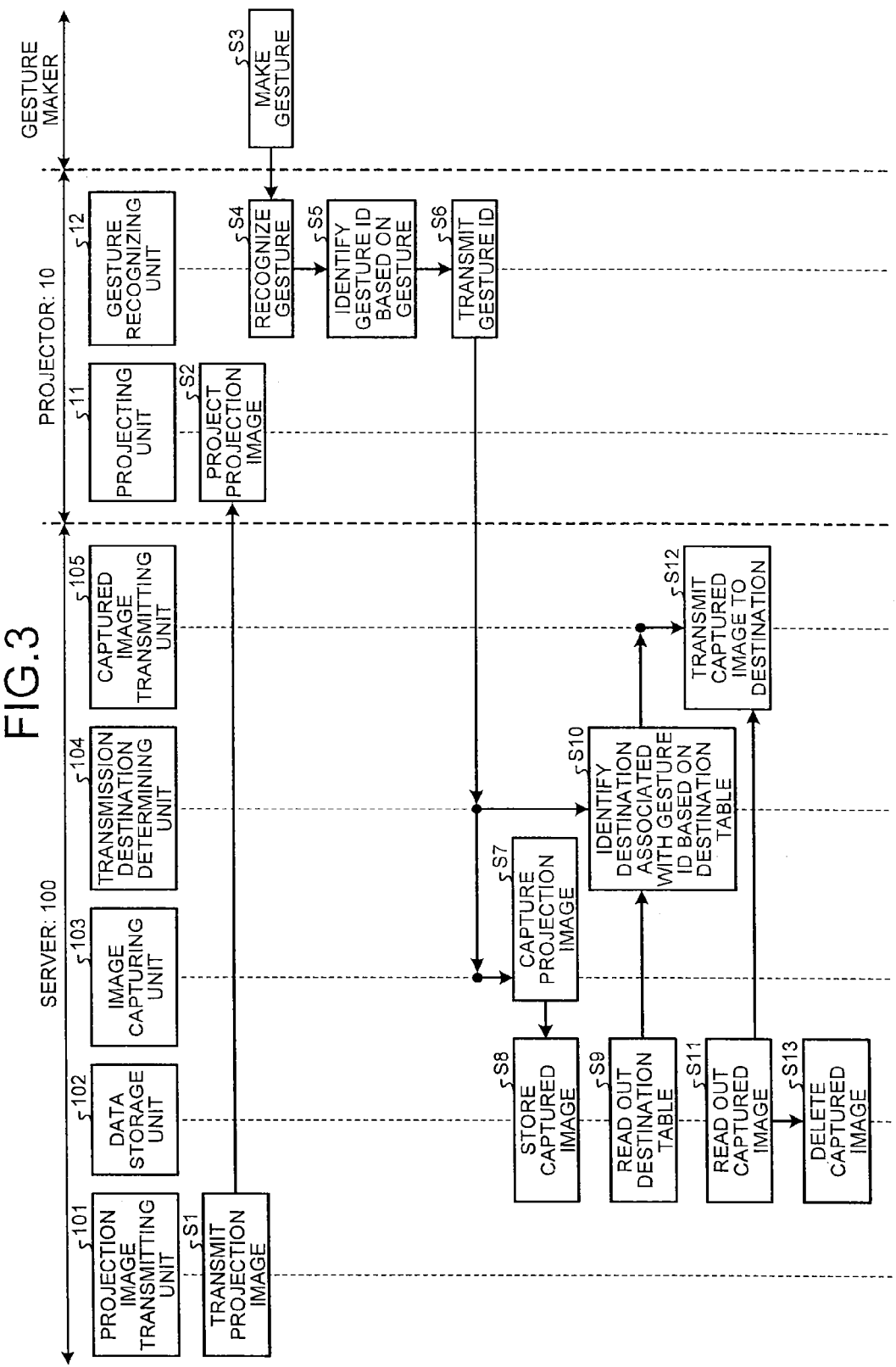

FIG.4

GESTURE ID ASSOCIATION TABLE

| GESTURE ACTION | GESTURE ID | INSTRUCTION CONTENT |
|---|---|---|
| WAVE RIGHT HAND RIGHT AND LEFT | 001 | CAPTURE PROJECTION IMAGE AND TRANSMIT IT TO DESTINATION A |
| RAISE ONLY INDEX FINGER OF RIGHT HAND | 002 | CAPTURE ENLARGED IMAGE OF PROJECTION IMAGE AND TRANSMIT IT TO DESTINATION B |
| CROSS RIGHT HAND AND LEFT HAND | 003 | TRANSMIT CAPTURED IMAGE TO DESTINATION C |
| ⋮ | ⋮ | ⋮ |

FIG.5

DESTINATION TABLE

| GESTURE ID | DESTINATION |
|---|---|
| 001 | aaa@abc.com |
| 002 | bbb@def.com |
| 003 | ccc@ghi.com |
| ⋮ | ⋮ |

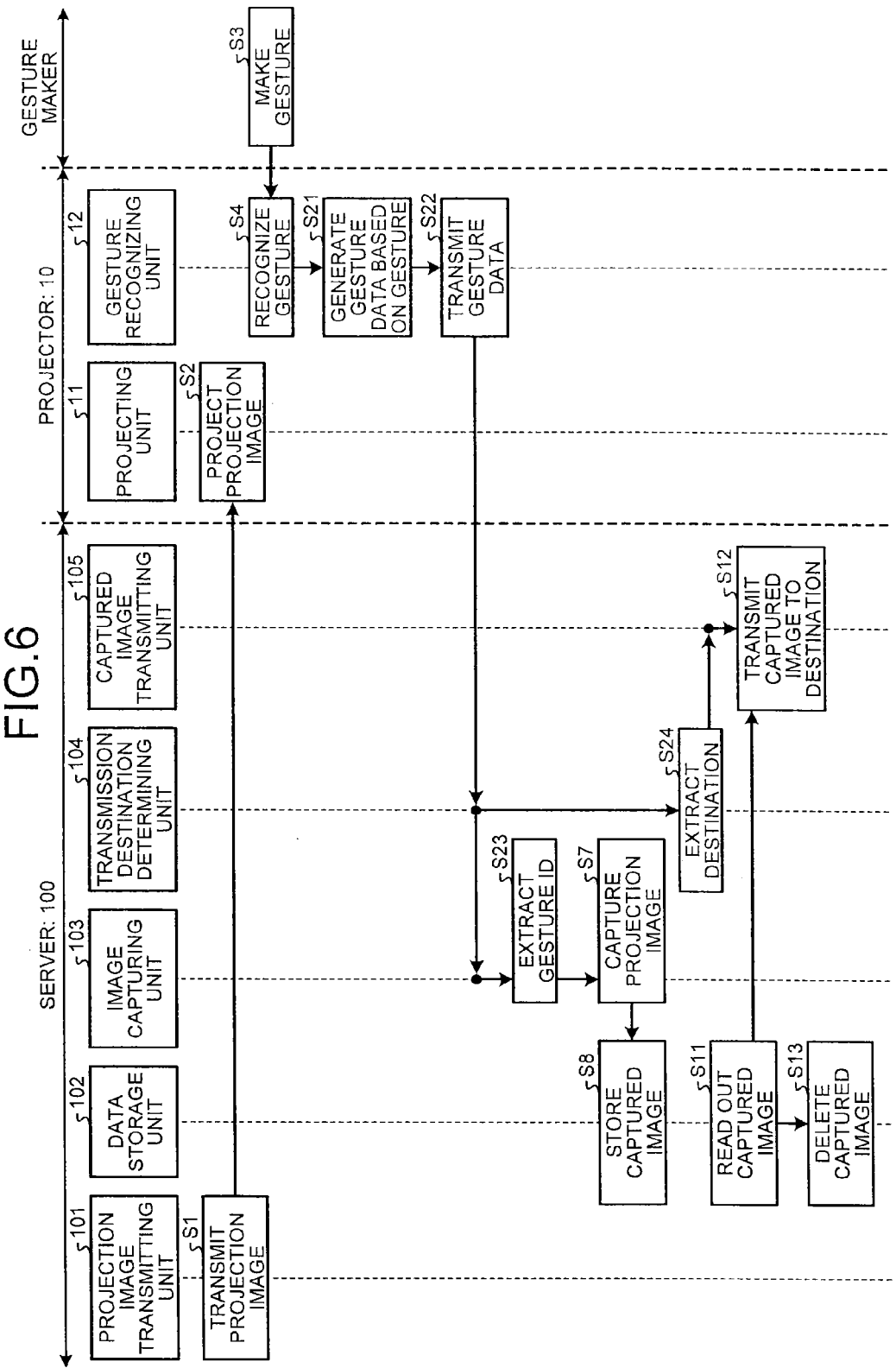

FIG.7

GESTURE ASSOCIATION TABLE

| GESTURE ACTION | GESTURE ID | INSTRUCTION CONTENT |
|---|---|---|
| WAVE RIGHT HAND RIGHT AND LEFT | 101 | INSTRUCT CAPTURING OF PROJECTION IMAGE |
| RAISE ONLY INDEX FINGER OF RIGHT HAND | 102 | INSTRUCT CAPTURING OF ENLARGED IMAGE OF PROJECTION IMAGE |
| CROSS RIGHT HAND AND LEFT HAND | 103 | INSTRUCT TRANSMISSION OF CAPTURED IMAGE |
| ⋮ | ⋮ | ⋮ |
| WAVE RIGHT HAND ONCE | 1 | CHARACTER STRING '1' |
| WAVE LEFT HAND ONCE | a | CHARACTER STRING 'a' |
| DRAW TRIANGLE WITH RIGHT HAND | . | CHARACTER STRING '.' |
| DRAW CIRCLE WITH LEFT HAND | @ | CHARACTER STRING '@' |
| ⋮ | ⋮ | ⋮ |

FIG.8

EXAMPLE OF GESTURE DATA

| | BYTE | GESTURE DATA |
|---|---|---|
| GESTURE ID | 1 | '1' (INSTRUCT CAPTURING OF PROJECTION IMAGE) |
| DESTINATION | 2 | 'a' (CHARACTER STRING 'a') |
| | 3 | 'b' (CHARACTER STRING 'b') |
| | 4 | 'c' (CHARACTER STRING 'c') |
| | 5 | '@' (CHARACTER STRING '@') |
| | ⋮ | ⋮ |

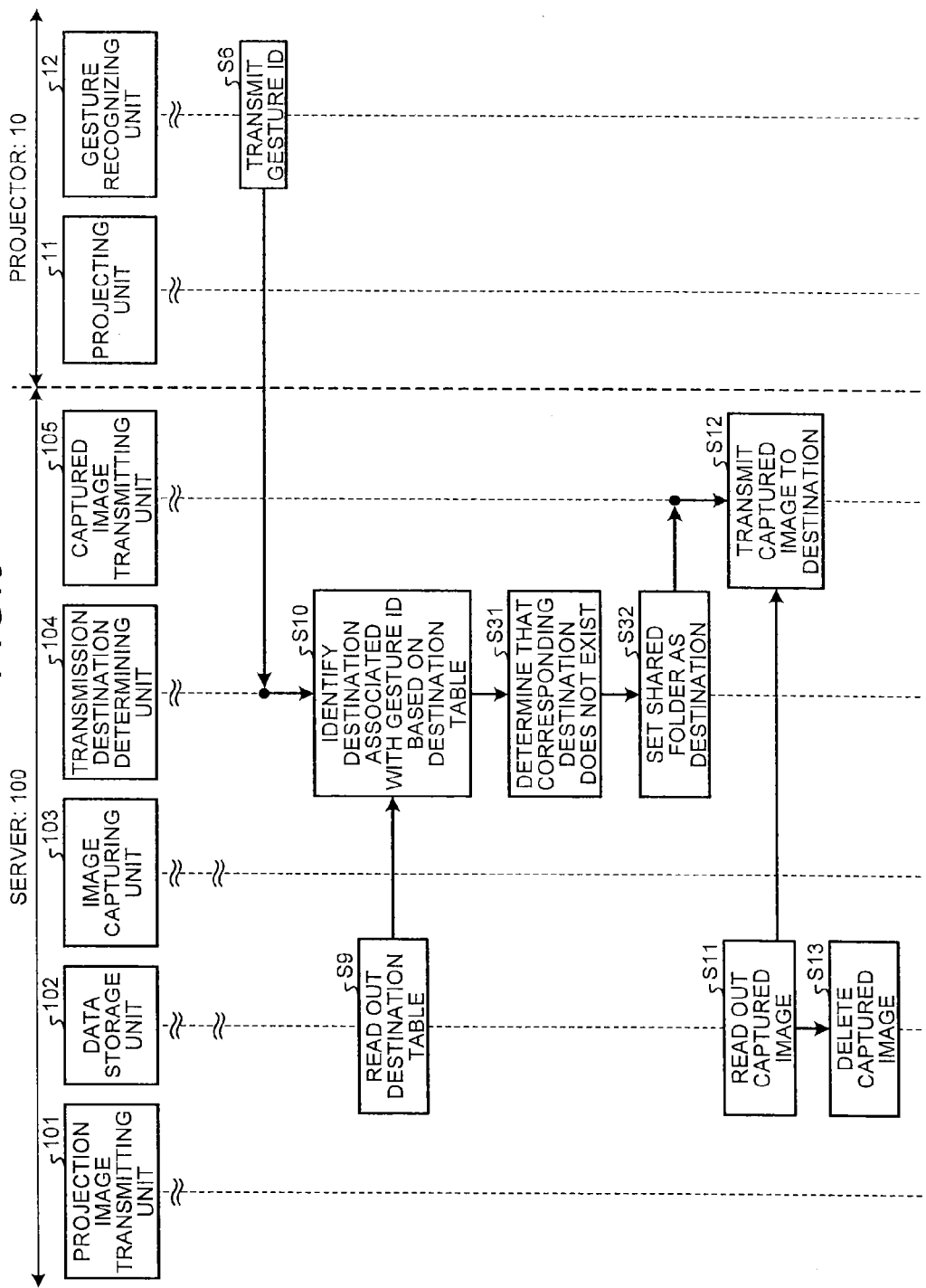

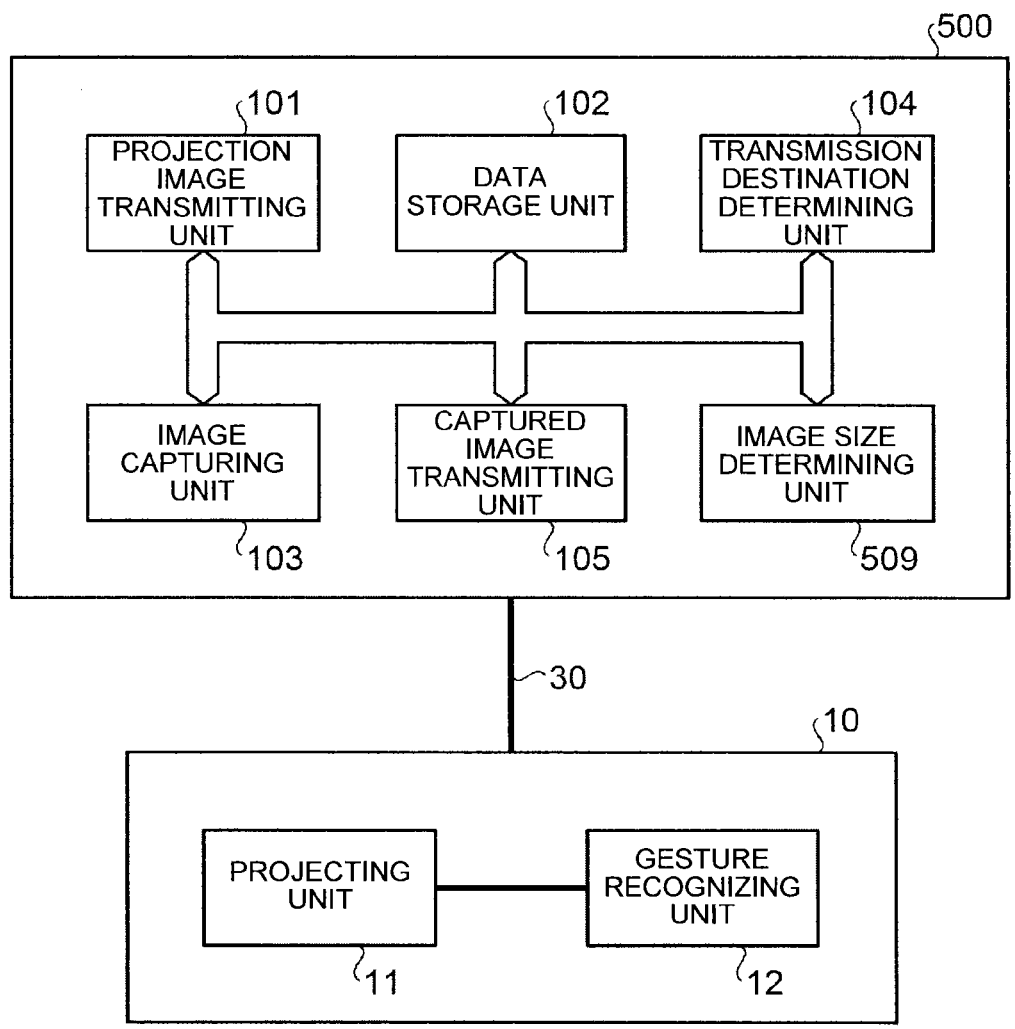

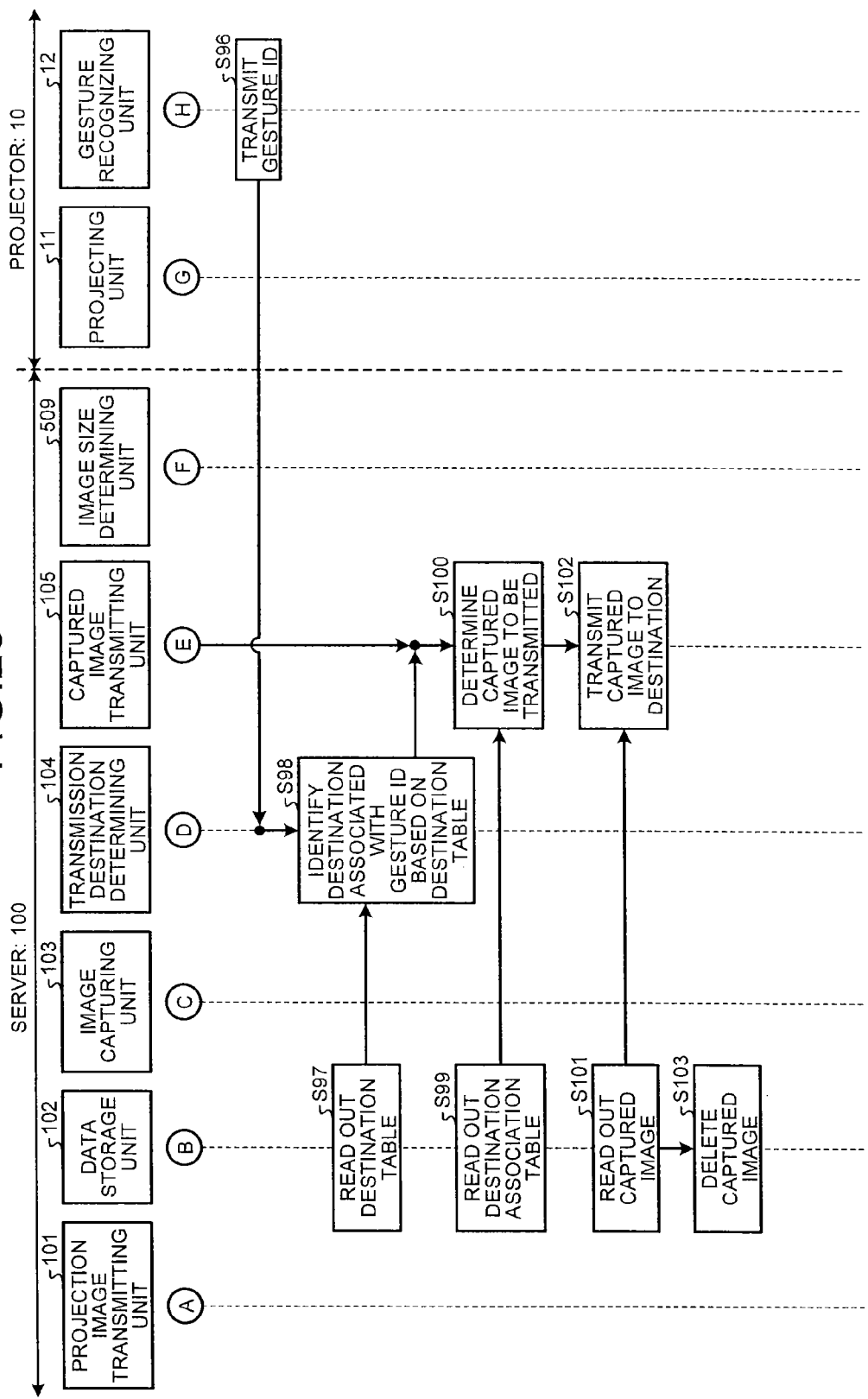

CONFERENCE PROJECTION SYSTEM WITH GESTURE-BASED IMAGE TRANSMITTING UNIT

CROSS-REFERENCE TO RELATED APPLICATIONS

The present application claims priority to and incorporates by reference the entire contents of Japanese Patent Application No. 2012-137321 filed in Japan on Jun. 18, 2012.

BACKGROUND OF THE INVENTION

1. Field of the Invention

The present invention relates to an information processing apparatus and a conference system.

2. Description of the Related Art

Conventionally, there exists, as a system for making a presentation in a conference, a seminar, or the like, a conference system having a configuration in which a main terminal device in a conference room (hereinafter referred to as a presentation personal computer (PC)), one or more sub terminal devices also in the conference room (hereinafter referred to as a participant PC), an image display unit displaying images or pictures for all participants (hereinafter referred to as a projector), and a server are connected to one another through a network.

The conference system may include a function of allowing a participant to acquire data held by a projector or a server using a participant PC, or to capture a snapshot of an image or a picture being projected by a projector, or the like. In such a conference system, it is possible to arrange it so that a picture or an image being projected by the projector is captured and stored in the projector or the server, and the captured image is acquired through a participant PC or a terminal such as a PC located at other place.

For example, the information display system disclosed in Japanese Patent Application Laid-open No. 2007-72687 is arranged so that a server has a function of causing a projector to display image information or the like received from a presentation PC, and a function of transmitting the image information received from the presentation PC to a participant PC in response to a request from the participant PC, in order to facilitate distribution of image information or the like to the participant viewing a presentation.

However, in the conventional conference system, instructions to the projector or the server such as an instruction to capture a projected picture or image and an instruction to acquire an image stored in the projector or the server need to be given from a terminal, such as a PC, connected to the server or the projector through a network. Thus, a participant can give an instruction to capture an image or acquire an image only when he/she has an operable terminal. Moreover, even if the participant has the operation terminal, he/she may not be able to give an instruction when the projector or the server cannot be accessed through the operation terminal in terms of security.

In view of the above, there is a need to provide an information processing apparatus and a conference system that make it possible to receive an instruction by a participant who does not have an operation terminal through which a projector or a sever can be accessed.

SUMMARY OF THE INVENTION

It is an object of the present invention to at least partially solve the problems in the conventional technology.

An information processing apparatus is connected to a projecting unit that projects an image and a gesture recognizing unit that recognizes a gesture by a person. The information processing apparatus includes: a projection image transmitting unit that inputs a projection image to the projecting unit; an image capturing unit that captures, when the gesture recognizing unit has recognized a gesture, a projection image being projected by the projecting unit; a transmission destination determining unit that determines a transmission destination address based on a gesture recognized by the gesture recognizing unit; and a captured image transmitting unit that transmits a captured image captured by the image capturing unit to a transmission destination address determined by the transmission destination determining unit.

A conference system includes: a projecting unit that projects an image; a projection image transmitting unit that inputs a projection image to the projecting unit; a gesture recognizing unit that recognizes a gesture by a person; an image capturing unit that captures, when the gesture recognizing unit has recognized a gesture, a projection image being projected by the projecting unit; a transmission destination determining unit that determines a transmission destination address based on a gesture recognized by the gesture recognizing unit; and a captured image transmitting unit that transmits a captured image captured by the image capturing unit to a transmission destination address determined by the transmission destination determining unit.

A conference supporting method includes: projecting an image; inputting a projection image projected at the projecting; recognizing a gesture by a person; capturing, when a gesture has been recognized at the recognizing, a projection image being projected at the projecting; determining a transmission destination address based on a gesture recognized at the recognizing; and transmitting a captured image captured at the capturing to a transmission destination address determined at the determining.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a sequence diagram illustrating schematic operation of the conference system in the first embodiment;

FIG. 4 is a diagram illustrating an example of a gesture identifier (ID) association table;

FIG. 5 is a diagram illustrating an example of a destination table;

FIG. 6 is a sequence diagram illustrating schematic operation of a conference system according to a second embodiment of the present invention;

FIG. 7 is a diagram illustrating an example of a gesture association table;

FIG. 8 is a diagram illustrating an example of gesture data;

FIG. 9 is a sequence diagram illustrating schematic operation of a conference system according to a third embodiment;

FIG. 20 is a block diagram illustrating schematic configurations of a server and a projector according to an eighth embodiment;

FIG. 21 is a diagram illustrating an example of a destination association table in the eighth embodiment;

FIG. 23 is a sequence diagram illustrating schematic operation of the conference system in the eighth embodiment (part 2).

DETAILED DESCRIPTION OF THE PREFERRED EMBODIMENTS

In the following, embodiments of the information processing apparatus, the conference system, and the conference supporting method of the invention are described in detail with reference to the accompanying drawings.

First Embodiment

Figure 1:
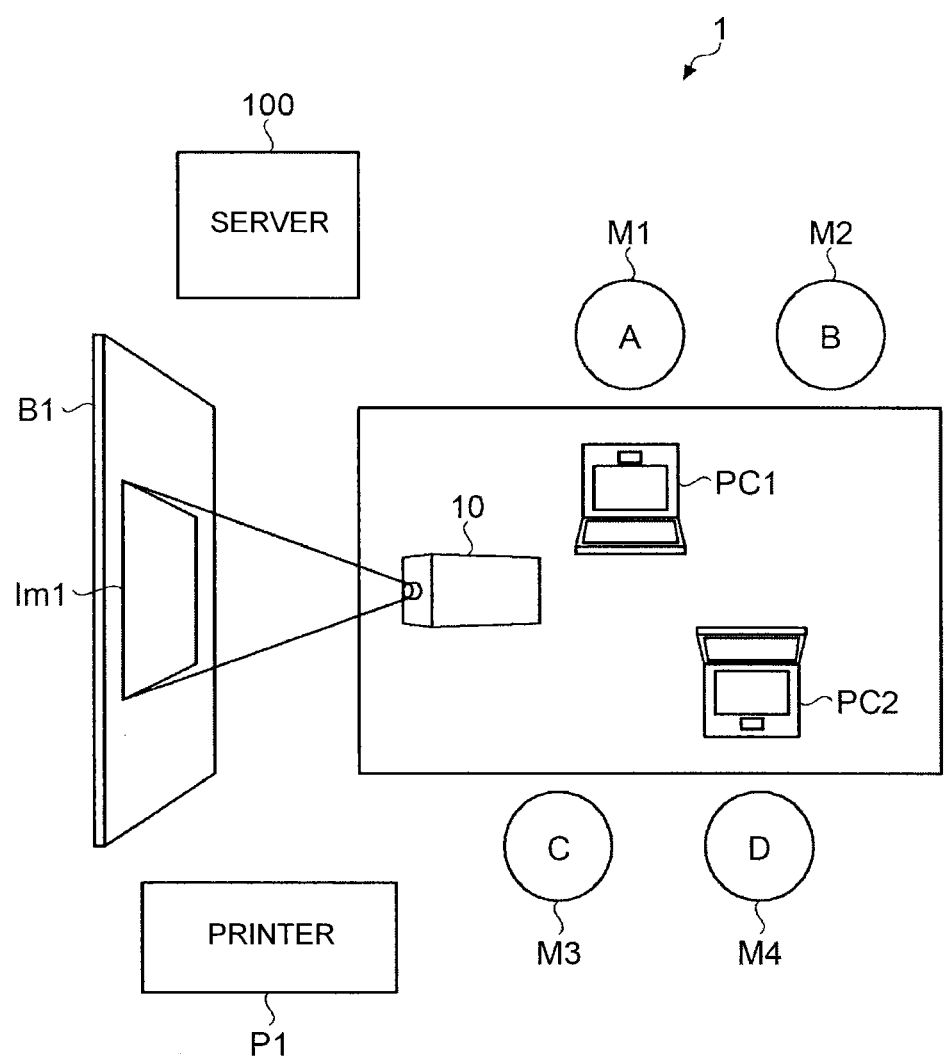
FIG. 1 is a layout of a conference room illustrating a schematic configuration of a conference system according to a first embodiment.

First, the information processing apparatus, the conference system, and the conference supporting method according to a first embodiment of the invention are described with reference to some drawings. FIG. 1 is a layout of a conference room illustrating a schematic configuration of a conference system 1 in the first embodiment. As illustrated in FIG. 1, the conference system 1 includes a projector 10, a server 100, a main terminal device (presentation PC) PC 1, and a sub terminal device (participant) PC 2. The server 100 may be located in a place other than the conference room. The conference system 1 may include peripherals such as a printer Pl. The server 100, the projector 10, the main terminal device PC1, the sub terminal device PC2, and the printer P1 are connected to one another through a network (not illustrated) (corresponding to a network 30 of FIG. 2). As the network, various networks such as a wireless local area network (LAN) and a wired LAN can be applied.

In such a conference room, a participant M1 makes a presentation while projecting an image or a picture of material for the presentation stored in any of the main terminal device PC1, the server 100, or the projector 10, on a white board B1 using the projector 10.

Moreover, there are participants M2 to M4 in the conference room, as the audience of the presentation by the participant M1. The sub terminal device PC2 can be operated by all of the participants M2 to M4, or by only the participant M4, for example. Any of the participants M2 to M4 may have a terminal device that cannot be connected to the server 100.

Figure 2:
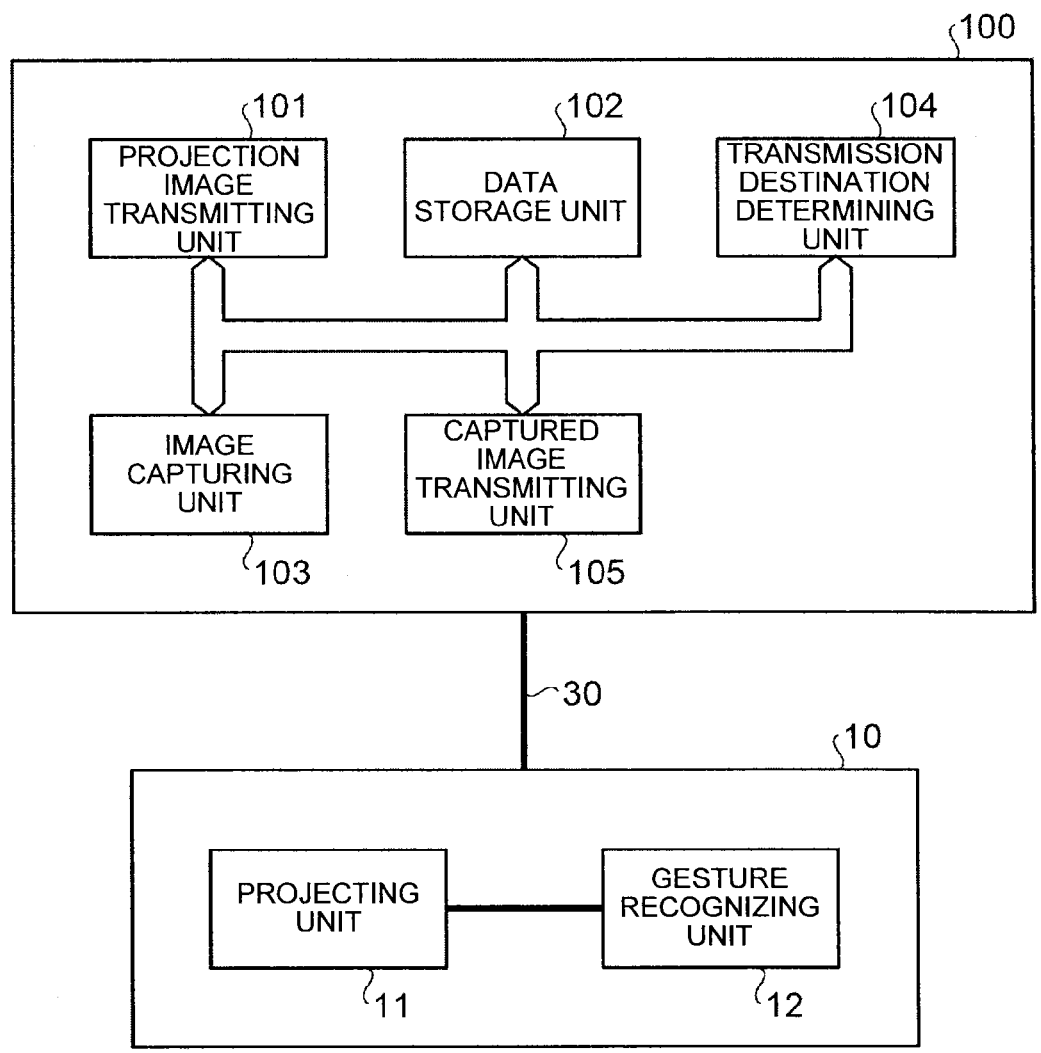
FIG. 2 is a block diagram illustrating schematic configurations of a server and a projector illustrated in FIG. 1.

Here, the configurations of the server 100 and the projector 10 in FIG. 1 are described with reference to FIG. 2. FIG. 2 is a block diagram illustrating schematic configurations of the server 100 and the projector 10. As illustrated in FIG. 2, the server 100 includes a projection image transmitting unit 101, a data storage unit 102, an image capturing unit 103, a transmission destination determining unit 104, and a captured image transmitting unit 105. The projector 10 includes a projecting unit 11 and a gesture recognizing unit 12. The server 100 and the projector 10 are connected to each other through the network 30, for example. The main terminal device PC1, the sub terminal device PC2, and the printer P1 are connected to the network 30, as described above.

The projection image transmitting unit 101 in the server 100 transmits an image or a picture to be projected by the projector 10 to the projector 10. The image or the picture to be projected may be data stored in the data storage unit 102 in the server 100, or data received by the server 100 through the network 30, for example, received from the main terminal device PC 1.

The image capturing unit 103 acquires a captured image of an image being projected (hereinafter referred to as a projection image), and stores the captured image as an image file in the data storage unit 102. The transmission destination determining unit 104 specifies a destination corresponding to a gesture ID using a destination table in which gesture IDs and destinations are associated. The data storage unit 102 holds image files captured by the image capturing unit 103, the destination table, and material for presentation.

The captured image transmitting unit 105 transmits the captured image stored in the data storage unit 102 to the destination determined by the transmission destination determining unit 104. For the transmission, various methods such as mail transmission, folder distribution (transmission to a folder on a network), and fax transmission can be employed.

The projecting unit 11 in the projector 10 projects an image or a picture received from the server 100 through the network 30. The gesture recognizing unit 12 includes a camera, an infrared sensor, or the like and recognizes and determines a gesture made by the participants M1 to M4. The gesture recognizing unit 12 identifies a gesture ID preliminarily associated with the recognized gesture. To the gesture recognizing unit 12, various methods can be applied such as a method of specifying a gesture ID using a table in which actions of a person (gesture actions) and gesture IDs are associated preliminarily.

Part of the configuration of the server 100 or the entire thereof may be provided in the projector 10. In such a case, the server 100 can be omitted. As the gesture recognizing unit 12, a dedicated device independent of the projector 10 may be used. In such a case, the dedicated device may transmit the result of recognition/determination of a gesture action to the server 100 so that a gesture ID is identified in the server 100.

Next, the operation of each unit of the server 100 and the projector 10 illustrated in FIG. 2 is described. FIG. 3 is a sequence diagram illustrating schematic operation of each unit of the server 100 and the projector 10 illustrated in FIG. 2. As illustrated in FIG. 3, the projection image transmitting unit 101 of the server 100 transmits a projection image to the projector 10 (Step S1). Then, the projecting unit 11 projects the projection image transmitted to the projector 10 on the white board B1 or the like. (Step S2).

The participants M1 to M4 make a gesture action (Step S3). For example, the participants M1 to M4 make a predetermined gesture at timing when a necessary image Im1 is projected. Then, the gesture recognizing unit 12 detects and recognizes the gesture action made by the participants M1 to M4 (Step S4), and identifies a gesture ID associated with the gesture action (Step S5). The association between the gesture action and the gesture ID may be registered preliminarily in a given table (a gesture ID association table: see FIG. 4). As illustrated in the gesture ID association table of FIG. 4, actions of a person that can be recognized by the gesture recognizing unit 12 such as an action of a hand, a leg, or a finger are registered as the gesture action. An unique identifier for identifying a gesture action uniquely (a value, for example) is registered as the gesture ID. The gesture ID association table is preliminarily held in a memory (not illustrated) in the projector 10, for example, and is read out by the gesture recognizing unit 12 if necessary.

The gesture recognizing unit 12 transmits the specified gesture ID to the server 100 (Step S6). The gesture ID received in the server 100 is input to the image capturing unit 103 and the transmission destination determining unit 104.

The image capturing unit 103 captures the projection image with the input of the gesture ID as a trigger, and converts the captured image into a file (Step S7). The captured image converted into a file is stored in the data storage unit 102 (Step S8).

The transmission destination determining unit 104 reads out a destination table (see FIG. 5) from the data storage unit 102 with the input of the gesture ID as a trigger (Step S9), and identifies a destination associated with the gesture ID in the destination table (Step S10). The association relation between gesture IDs and destinations is registered preliminarily in the destination table. The destinations may be mail addresses, addresses of private folders or shared folders, or the like that are preliminarily registered by the participants M1 to M4. The destination identified by the transmission destination determining unit 104 is input to the captured image transmitting unit 105.

The captured image transmitting unit 105 reads out the captured image stored in the data storage unit 102 with the input of the destination as a trigger (Step S11), and transmits the read captured image to the specified destination (Step S12). The read captured image may be deleted from the data storage unit 102 (Step S13).

In the above processes, the operation from the capturing of the projection image to the transmission of the captured image is performed through one gesture. However, the embodiment is not limited thereto, and a capturing instruction and a transmission instruction may be given by separate gestures, for example. In such a case, the projection image is captured when the gesture for instructing capturing is made, and the stored captured image is transmitted when the gesture for instructing transmission is made.

The file of the captured image is deleted from the data storage unit 102 once the transmission of the captured image is completed, whereby it is possible to suppress the waste of the storage area of the server 100.

As described above, in the first embodiment, it is possible to give an instruction to capture a projected image or picture and an instruction to transmit the captured image, directly to the projector 10 through a gesture that is an action of a person. This allows a participant who does not have an operation terminal to give an instruction to capture a projection image and an instruction to transmit a captured image. Moreover, even a participant who has an operation terminal but cannot give an instruction through the terminal can give an instruction to capture a projection image and an instruction to transmit a captured image.

Second Embodiment

Next, the information processing apparatus, the conference system, and the conference supporting method according to a second embodiment of the invention are described in detail with reference to some drawings. In the following, the same components as in the embodiment described above are denoted by the same symbols, and the overlapped descriptions thereof are omitted.

In the first embodiment, unique identifiers are used as the gesture IDs, and such unique identifiers and the destinations are associated preliminarily in the destination table. However, the embodiment is not limited thereto, and a configuration may be employed in which the participants M1 to M4 input a destination through a gesture, as in the second embodiment described in the following.

The configuration of the conference system in the second embodiment may be the same as of the conference system 1 illustrated in FIG. 1. However, part of the operation illustrated in FIG. 3 is substituted as illustrated in FIG. 6. The gesture ID association table illustrated in FIG. 4 is substituted by a gesture association table illustrated in FIG. 7.

That is, in the second embodiment, a gesture made by a gesture maker among the participants M1 to M4 is recognized through the same processes as at Steps S1 to S4 in FIG. 3 (Steps S1 to S4). Here, the gesture maker makes a gesture action for inputting a destination, in addition to a gesture action for instructing capturing, transmission, or the like. The gesture recognizing unit 12 refers to the gesture association table and generates gesture data including a gesture ID and a destination based on the recognized series of gesture actions (Step S21). In the gesture association table, the association relation between gesture actions and character strings ('a' to 'z', '@', and '.', for example) is stored in addition to the association between gesture actions and gesture IDs illustrated in FIG. 4. Therefore, the gesture maker makes a gesture action for specifying a character string to input a destination following a gesture action for instructing capturing, transmission, or the like. However, the embodiment is not limited thereto, and gesture actions and destinations may be associated preliminarily in the gesture association table. In such a case, the gesture maker may make a gesture action for specifying a destination following a gesture action for instructing capturing, transmission, or the like.

The gesture recognizing unit 12 generates gesture data having a predetermined data structure. As illustrated in FIG. 8, in gesture data, the gesture ID is stored in a predetermined byte (a lead byte, for example), while the destinations are stored in the other bytes, for example.

The gesture data is transmitted to the server 100 (Step S22), and input to the image capturing unit 103 and the transmission destination determining unit 104.

Upon input of the gesture data, the image capturing unit 103 extracts the gesture ID from the gesture data (Step S23). Thereafter, the image capturing unit 103 generates a captured image of the projection image in the same manner as in FIG. 3 (Step S7), and stores the captured image in the data storage unit 102 (Step S8).

Upon input of the gesture data, the transmission destination determining unit 104 extracts the destination from the gesture data and inputs the extracted destination to the captured image transmitting unit 105 (Step S24).

Then, the captured image transmitting unit 105 reads out the captured image stored in the data storage unit 102 with the input of the destination as a trigger, in the same manner as in FIG. 3 (Step S11), and transmits the read captured image to the specified destination (Step S12). The read captured image may be deleted from the data storage unit 102 (Step S13).

As described above, in the second embodiment, it is possible to determine a destination and transmit a captured image thereto even if a destination table in which gestures and destinations are associated is not managed in a server. As a result, it is possible to transmit a captured image to a user who is not preliminarily registered in a destination table. Other configurations, operation, and effects are the same as in any of the embodiment described above. Thus, the detailed descriptions thereof are omitted.

Third Embodiment

Next, the information processing apparatus, the conference system, and the conference supporting method according to a third embodiment of the invention are described in detail with reference to some drawings. In the following, the same components as in the embodiments described above are denoted by the same symbols, and the overlapped descriptions thereof are omitted.

It is assumed, in the first embodiment, that gesture actions (gesture IDs) are associated with destinations preliminarily. However, gesture actions (gesture IDs) are not necessarily associated with destinations. In such a case, a captured image may be transmitted to a destination (a shared folder, for example) preliminarily set separately, as in the third embodiment described in the following.

The configuration of the conference system in the third embodiment may be the same as of the conference system 1 illustrated in FIG. 1. However, part of the operation illustrated in FIG. 3 is substituted by operation illustrated in FIG. 9. In FIG. 9, part of operation in common with the operation in FIG. 3 is omitted. It is assumed in FIG. 9 that a corresponding destination is not registered in the destination table.

As illustrated in FIG. 9, the operation for identifying a destination to which a captured image is transmitted based on the destination table is performed through the same processes as at Steps S1 to S10 in FIG. 3 (Steps S1 to S10). However, a destination is not identified through the operation at Step S10. In such a case, the transmission destination determining unit 104 determines that a specified destination is not registered in the destination table (Step S31) and, alternatively, sets a predetermined destination (the address of a shared folder, for example) as a transmission destination, and inputs the destination to the captured image transmitting unit 105 (Step S32).

Thereafter, the captured image transmitting unit 105 reads out the captured image stored in the data storage unit 102 with the input of the destination as a trigger in the same manner as in FIG. 3 (Step S11), and transmits the read captured image to the specified destination (Step S12). The read captured image may be deleted from the data storage unit 102 (Step S13).

As described above, in the third embodiment, it is possible to transmit a captured image to a predetermined destination such as a shared folder or a manager destination, even when a destination having been specified does not exist and thus a captured image cannot be transmitted. In this manner, it is possible to certainly provide a captured image to a participant even when a destination does not exist. Other configurations, operation, and effects are the same as in any of the embodiments described above. Thus, the detailed descriptions thereof are omitted.

Fourth Embodiment

Next, the information processing apparatus, the conference system, and the conference supporting method according to a fourth embodiment of the invention are described in detail with reference to some drawings. In the following, the same components as in the embodiments described above are denoted by the same symbols, and the overlapped descriptions thereof are omitted.

In the fourth embodiment, a participant in a conference is authenticated. In the following description, a method using an integrated circuit (IC) card preliminarily given to each participant is adopted to authenticate participants. However, the embodiment is not limited thereto, and the authentication using an ID and a password or the biometric authentication using a face or fingerprints can be adopted.

Figure 10:
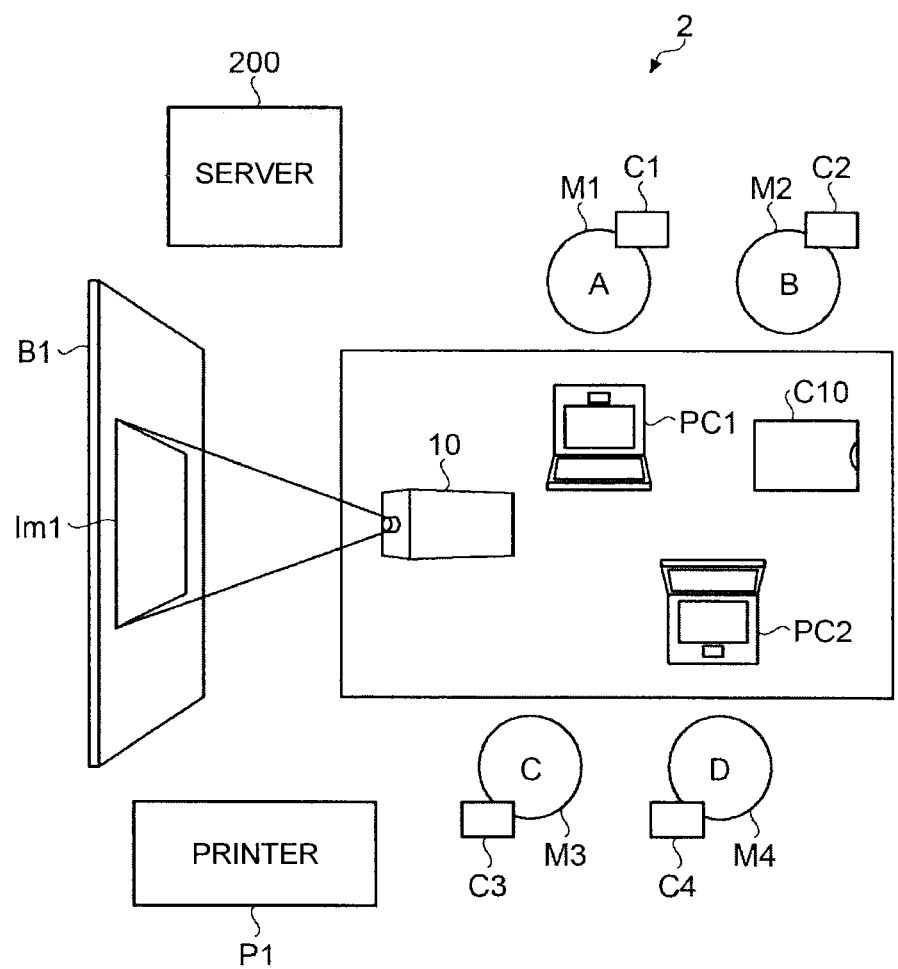
FIG. 10 is a layout of a conference room illustrating a schematic configuration of a conference system according to a fourth embodiment.

FIG. 10 is a layout of a conference room illustrating a schematic configuration of a conference system 2 in the fourth embodiment. As illustrated in FIG. 10, the conference system 2 includes an IC card reader C10 in addition to the same components as of the conference system 1 illustrated in FIG. 1. Moreover, the server 100 is substituted by a server 200.

The participants M1 to M4 carry IC cards C1 to C4 storing therein unique identification information. The IC cards C1 to C4 may preliminarily store therein destinations of the participants M1 to M4 carrying them, respectively. When the participants M1 to M4 participate in a conference, they hold the respective IC cards C1 to C4 over the IC card reader C10 first. Thus, the participants M1 to M4 in the conference are identified, and the destinations of the participants M1 to M4 are registered in the server 200.

Figure 11:
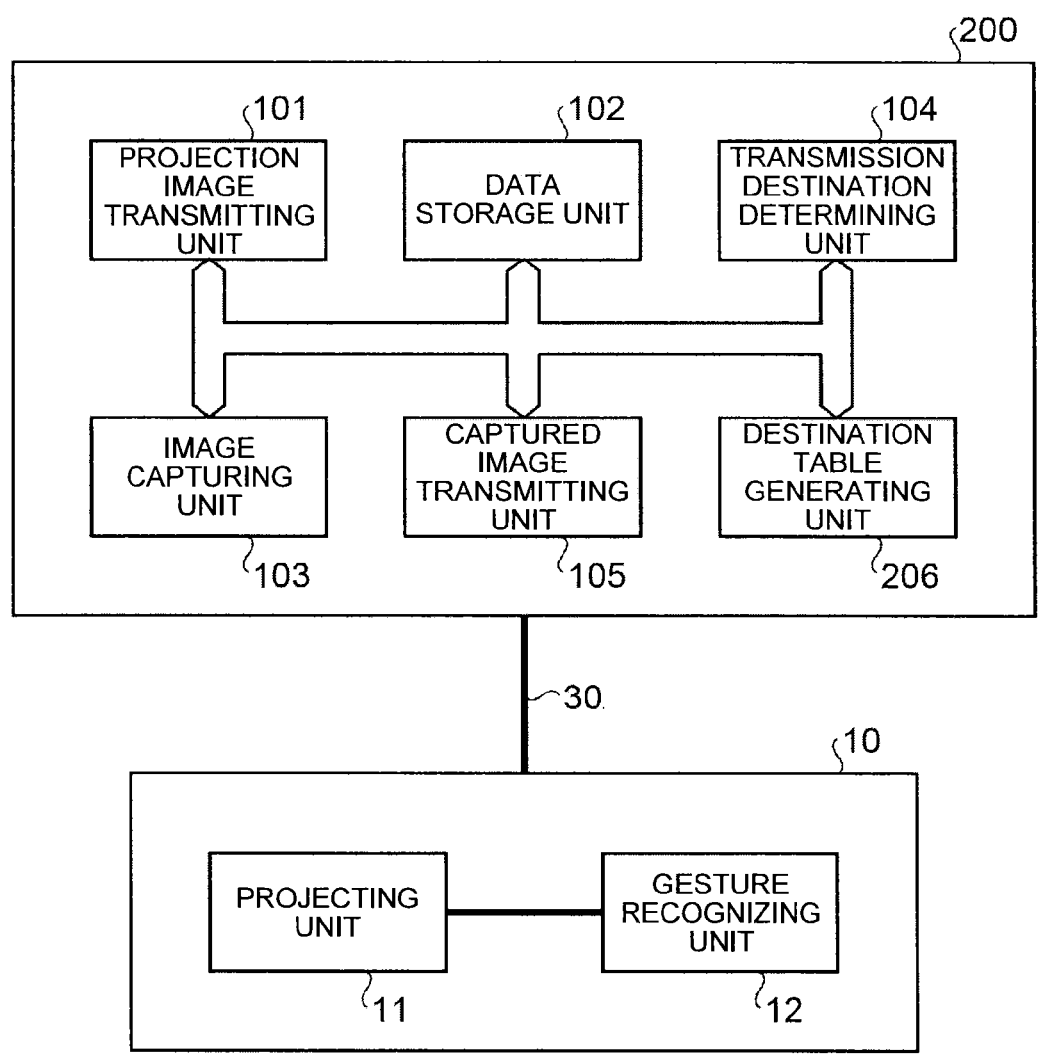
FIG. 11 is a block diagram illustrating schematic configurations of a server and a projector illustrated in FIG. 10.

FIG. 11 illustrates schematic configurations of the server 200 and the projector 10 illustrated in FIG. 10. As illustrated in FIG. 11, the server 200 includes a destination table generating unit 206 in addition to the same components as in the server 100 illustrated in FIG. 2. The destination table generating unit 206 forms a destination table (see FIG. 5) using the destination information of the participants M1 to M4 transmitted from the IC card reader C10. The configuration of the projector 10 may be the same as the configuration illustrated in FIG. 2.

Figure 12:
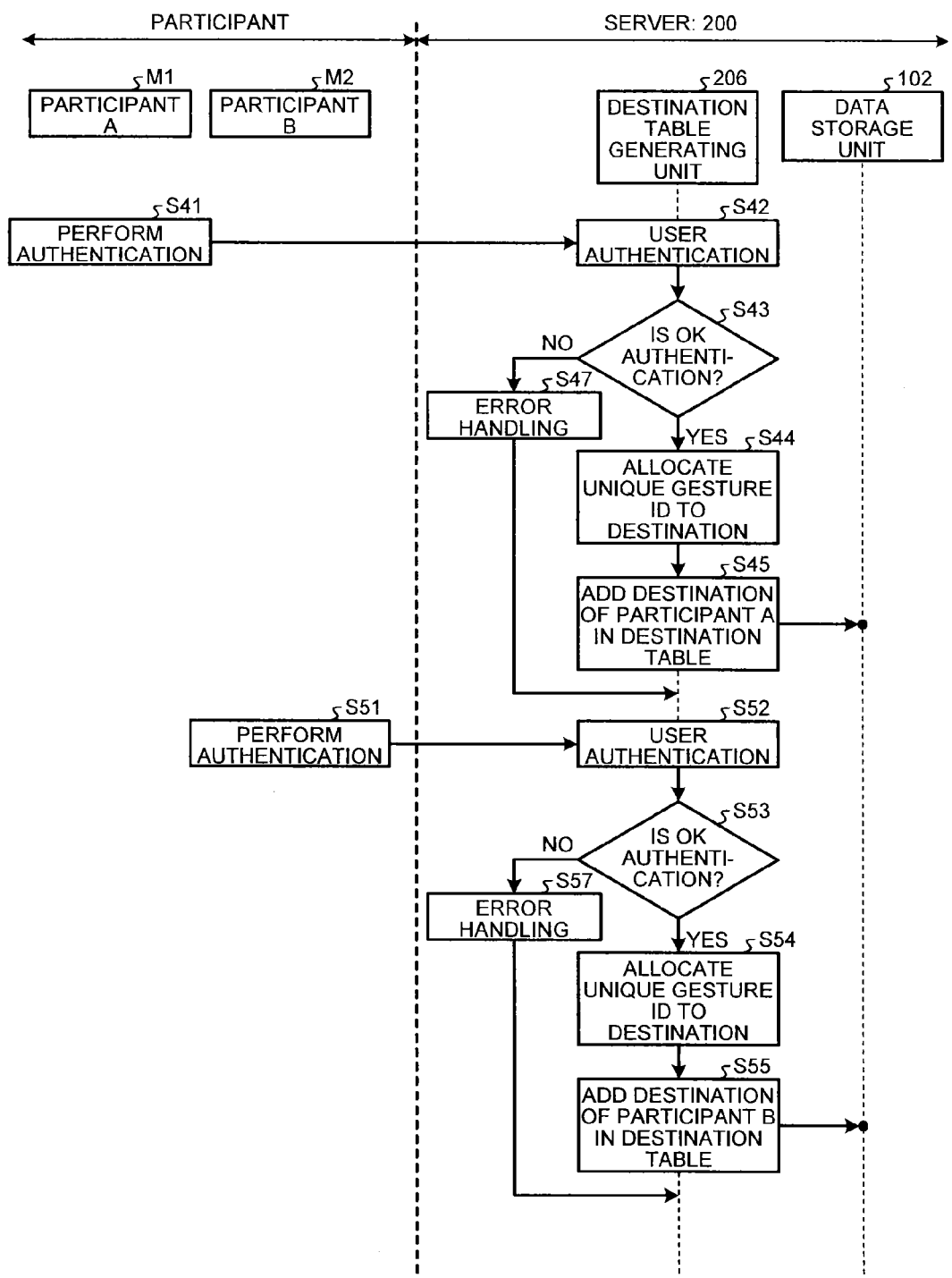
FIG. 12 is a sequence diagram illustrating an example of authentication operation in the fourth embodiment.

Subsequently, the authentication operation performed to start the conference is described with reference to some drawings. FIG. 12 is a sequence diagram illustrating an example of authentication operation in the fourth embodiment. As illustrated in FIG. 12, when the participant (A) M1 holds his/her IC card C1 over the IC card reader C10 for authentication (Step S41), the participant information read out by the IC card reader C10 is transmitted to the server 200. The participant information received by the server 200 is input to the destination table generating unit 206.

Upon input of the participant information, the destination table generating unit 206 extracts identification information identifying uniquely the participant (A) M1 from the participant information, and performs, using the identification information, user authentication to determine whether the participant (A) M1 is eligible to participate in the conference (step S42). A list of persons who are eligible to participate in the conference may be held preliminarily by the data storage unit 102 in the server 200.

When the participant (A) M1 subjected to authentication is determined to be eligible to participate in the conference (Yes at Step S43), the destination table generating unit 206 extracts destination information from the participant information, and allocates a unique gesture ID to the destination information (Step S44). For the allocation of a gesture ID to a destination, a method of allocating a gesture ID in the order of authentication or a method of allocating a gesture ID in the alphabetical order of names can be employed.

Next, the destination table generating unit 206 adds the association relation between the gesture ID and the destination in the destination table (see FIG. 5) (Step S45). Thus, the destination of the participant (A) M1 is registered in the destination table. However, when an error occurred in user authentication at Step S42 (No at Step S43), the destination table generating unit 206 performs error handling (Step S47). In the error handling, the failure of user authentication is output with sound or display, for example, thus prompting the participant (A) M1 to be subjected to authentication again.

Subsequently, the user authentication is performed in the same manner for the participants (B) M2 to M4 using IC cards C2 to C4, respectively. When the authentication succeeds, the destinations of the participants (B) M2 to M4 are registered in the destination table (Step S51 to S57).

Thereafter, the operation illustrated in FIG. 3, for example, is performed.

As described above, in the fourth embodiment, it is possible to collect information of participants in a conference before the conference is started, for example, and form a destination table using destinations of the participants. This can reduce efforts for forming a destination table preliminarily. Other configurations, operation, and effects are the same as in any of the embodiments described above. Thus, the detailed descriptions thereof are omitted.

The configuration for performing authentication using participant information stored in the IC cards C1 to C4 may be provided in a component other than the server 200 (in an authentication system, for example). In such a case, when the authentication system has information of posts or the like of the participants M1 to M4, for example, a configuration may be employed in which the eligibility for participation or the availability of transmission of a captured image is determined based on such information of posts or the like. For example, a configuration can be employed in which a captured image is permitted to be transmitted to only participants whose post is section chief or higher.

Fifth Embodiment

Next, the information processing apparatus, the conference system, and the conference supporting method according to a fifth embodiment of the invention are described in detail with reference to some drawings. In the following, the same components as in the embodiments described above are denoted by the same symbols, and the overlapped descriptions thereof are omitted.

In the fifth embodiment, a function of notifying the participants M1 to M4 of occurrence of an error is added. The error notification function may be provided in the projector 10 or the server 100. In the fifth embodiment described in the following, the error notification function is provided in the projector 10.

The configuration of the conference system in the fifth embodiment may be the same as of the conference system 1 or 2 illustrated in FIG. 1 or 10. However, the projector 10 is substituted by a projector 20 illustrated in FIG. 13.

Figure 13:
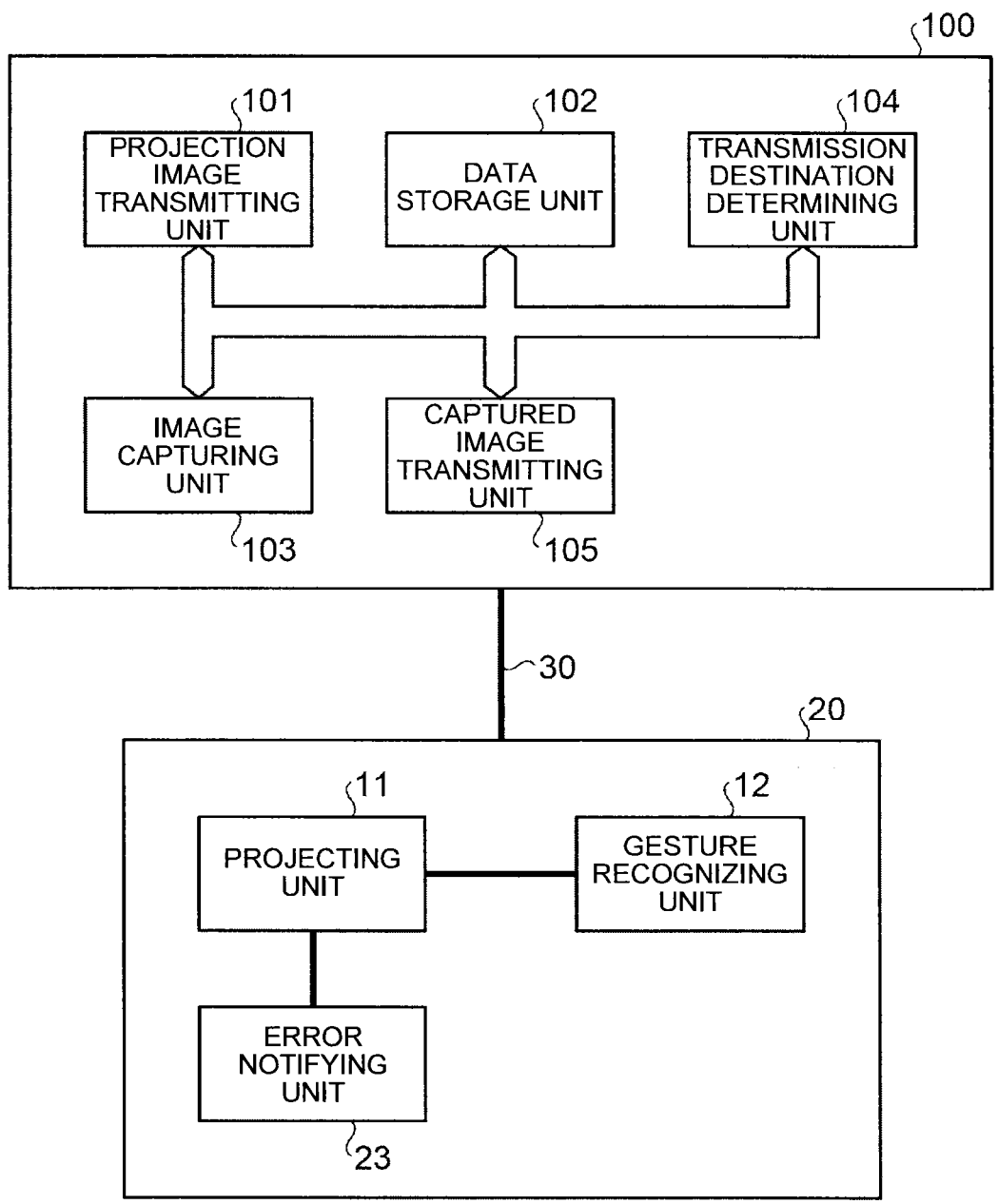
FIG. 13 is a block diagram illustrating schematic configurations of a server and a projector according to a fifth embodiment of the present invention.

As illustrated in FIG. 13, the projector 20 includes an error notifying unit 23 notifying the participants M1 to M4 of occurrence of an error, in addition to the same components as of the projector 10 illustrated in FIG. 2. The error notifying unit 23 notifies the participants M1 to M4 of an error when the gesture recognizing unit 12 has failed to recognize a gesture, when the image capturing unit 103 has failed to capture an image, or when the captured image transmitting unit 105 has failed to transmit an image, for example. Each unit in which an error has occurred may cancel processing after the occurrence of the error, and notify the error notifying unit 23 of the occurrence of the error.

Figure 14:
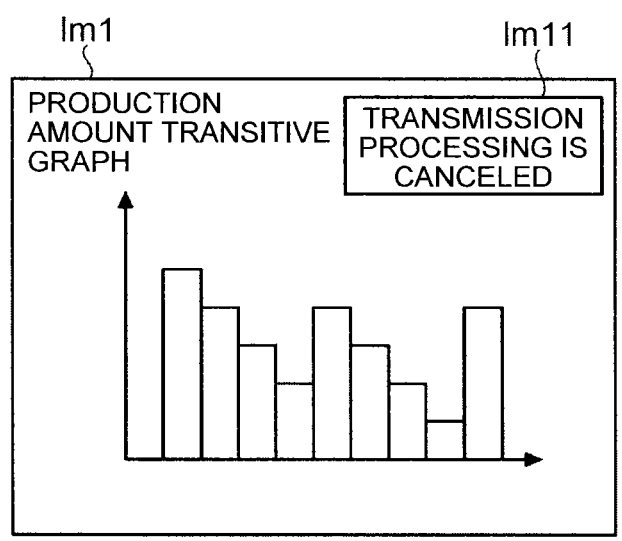
FIG. 14 is a diagram illustrating an example of an image projected in the fifth embodiment.

When an error has occurred in a unit of the server 100 or the projector 20, the error notifying unit 23 displays, on an image Im1 projected by the projecting unit 11, a pop-up Im11 indicating that an error has been occurred or the processing has been cancelled due to the occurrence of the error, for example, as illustrated in FIG. 14. However, the embodiment is not limited thereto, and the error notifying unit 23 may light a light emitting diode (LED) provided in the projector 20, the server 100, or a gesture recognizing device (not illustrated), in a specified pattern, emit audio guidance from a speaker provided in the projector 20, the server 100, or the gesture recognizing device, record a log of the occurrence of the error in an error log managed by the server 100, or transmit a mail to a predetermined destination.

Figure 15:
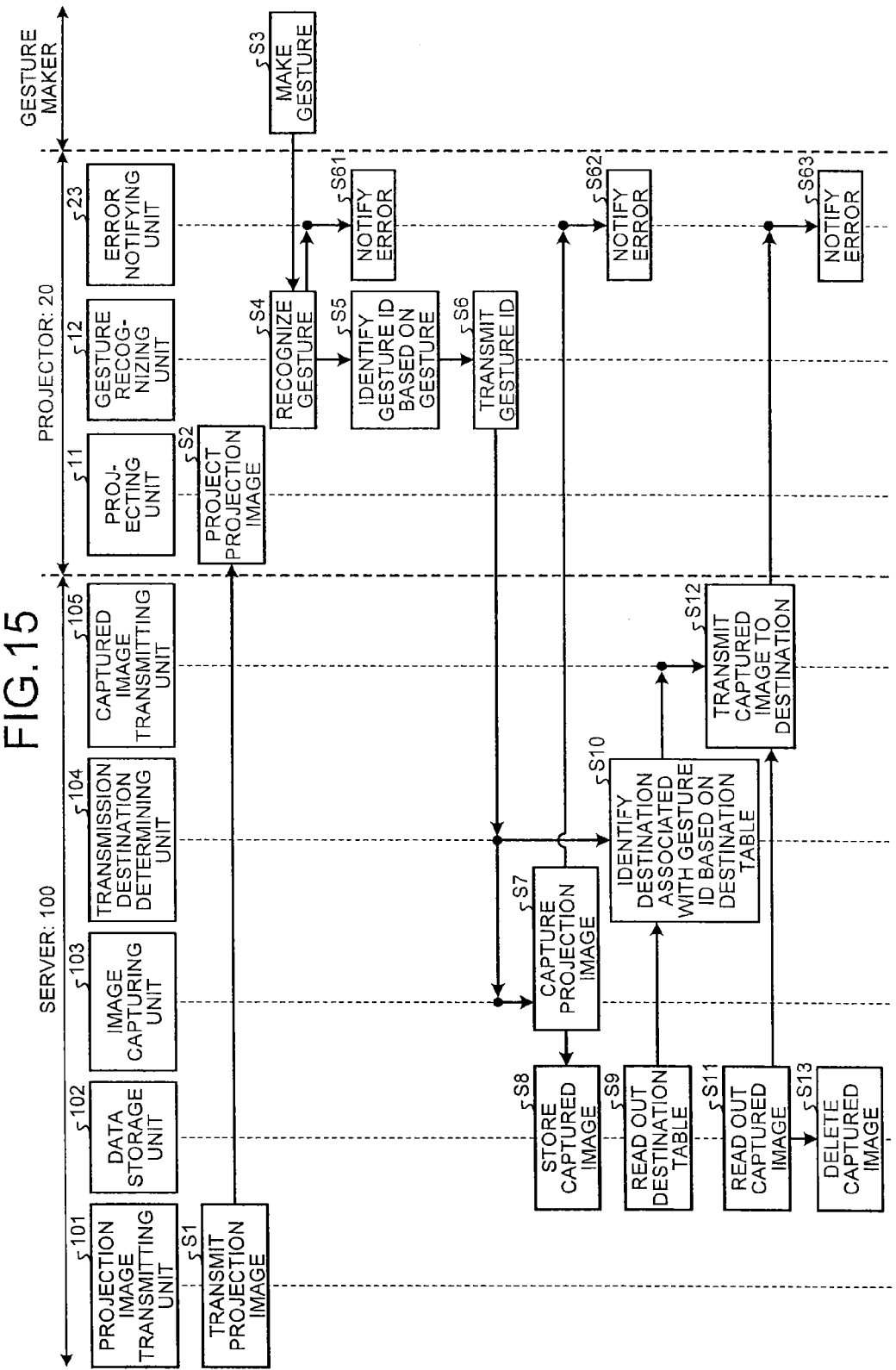
FIG. 15 is a sequence diagram illustrating schematic operation of a conference system in the fifth embodiment.

Subsequently, the operation of the conference system in the fifth embodiment is described. The basic operation of the conference system in the fifth embodiment may be the same as the operation illustrated in FIG. 3. However, when an error has occurred during the operation, the processes added in FIG. 15 are performed.

That is, when the gesture recognizing unit 12 has failed to recognize a gesture action performed by a gesture maker at Step S4, for example, the gesture recognizing unit 12 notifies the error notifying unit 23 of the occurrence of an error. The error notifying unit 23 notifies the participants M1 to M4 of the failure in recognition of a gesture with the notification of the occurrence of the error from the gesture recognizing unit 12 as a trigger (Step S61).

Moreover, when the image capturing unit 103 has failed to capture a projection image at Step S7, for example, the image capturing unit 103 notifies the error notifying unit 23 of the occurrence of an error. The error notifying unit 23 notifies the participants M1 to M4 of the occurrence of an error in the image capturing with the notification of the occurrence of the error from the image capturing unit 103 as a trigger (Step S62).

Furthermore, when the captured image transmitting unit 105 has failed to transmit a captured image at Step S12, for example, the captured image transmitting unit 105 notifies the error notifying unit 23 of the occurrence of an error. The error notifying unit 23 notifies the participants M1 to M4 of the occurrence of an error in the image transmission with the notification of the occurrence of the error from the captured image transmitting unit 105 as a trigger (Step S63).

As described above, in the fifth embodiment, the occurrence of errors is notified to the participants as occasion demands. Thus, the participant can recognize instantly that the acquisition of a captured image has failed. Other configurations, operation, and effects are the same as in any of the embodiments described above. Thus, the detailed descriptions thereof are omitted.

Sixth Embodiment

Next, the information processing apparatus and the conference system according to a sixth embodiment of the invention are described in detail with reference to some drawings. In the following, the same components as in the embodiments described above are denoted by the same symbols, and the overlapped descriptions thereof are omitted.

In the sixth embodiment, a function of processing a projection image and capturing it is added in the embodiments described above. The configuration of the conference system in the sixth embodiment may be the same as of the conference system 1 or 2 illustrated in FIG. 1 or FIG. 10. However, the server 100 is substituted by a server 300 illustrated in FIG. 16.

Figure 16:
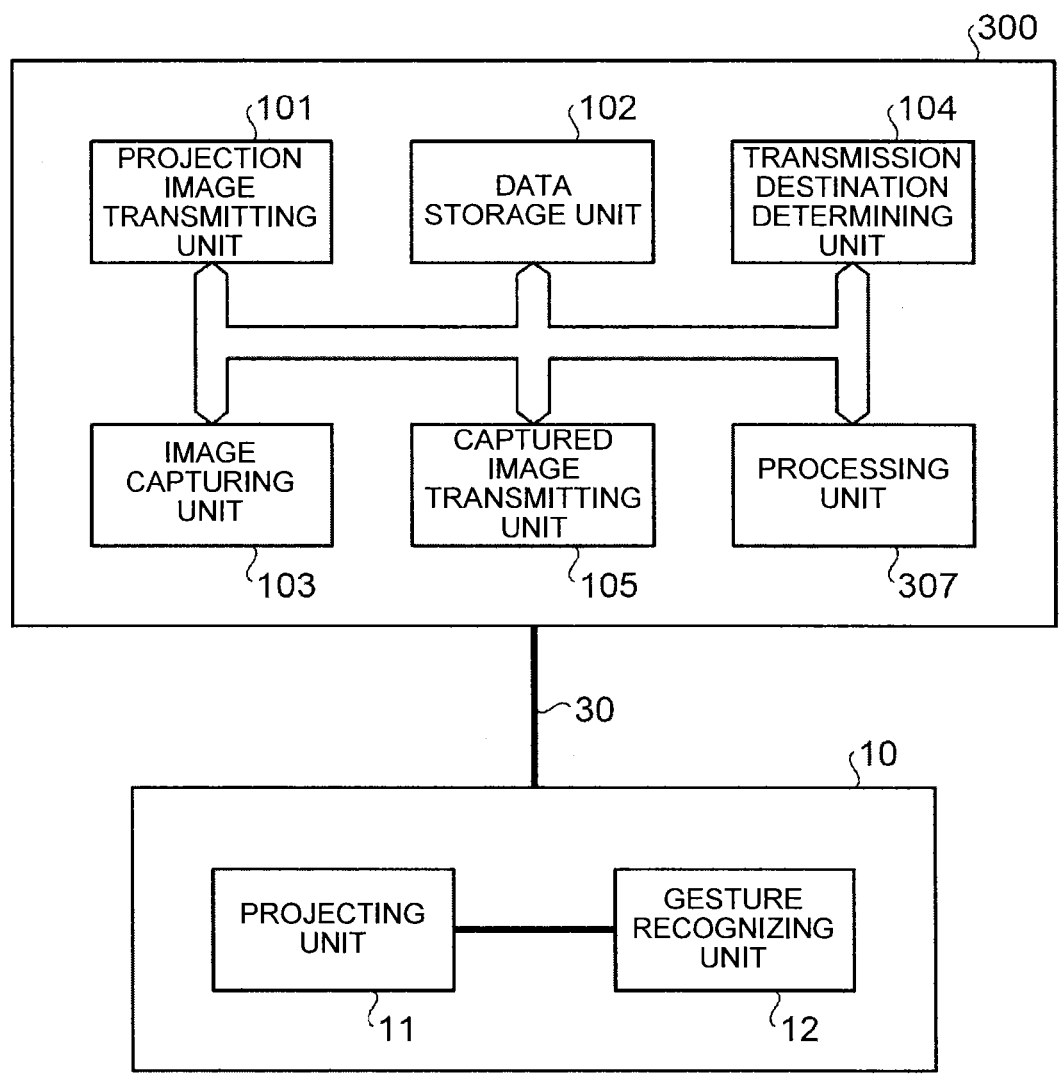
FIG. 16 is a block diagram illustrating schematic configurations of a server and a projector according to a sixth embodiment of the present invention.

As illustrated in FIG. 16, the server 300 includes a processing unit 307 processing an image to be projected by the projector 10, in addition to the same components as of the server 100 illustrated in FIG. 2. The processing operation by the processing unit 307 can include processing for enlarging the entire or part of an image, processing for reducing an image, processing for trimming part of an image, and processing for moving a projection position of an image. The image processed by the processing unit 307 (processed image) may be stored in the data storage unit 102 as a captured image, or transmitted to the projector 10 as a projection image.

Figure 17:
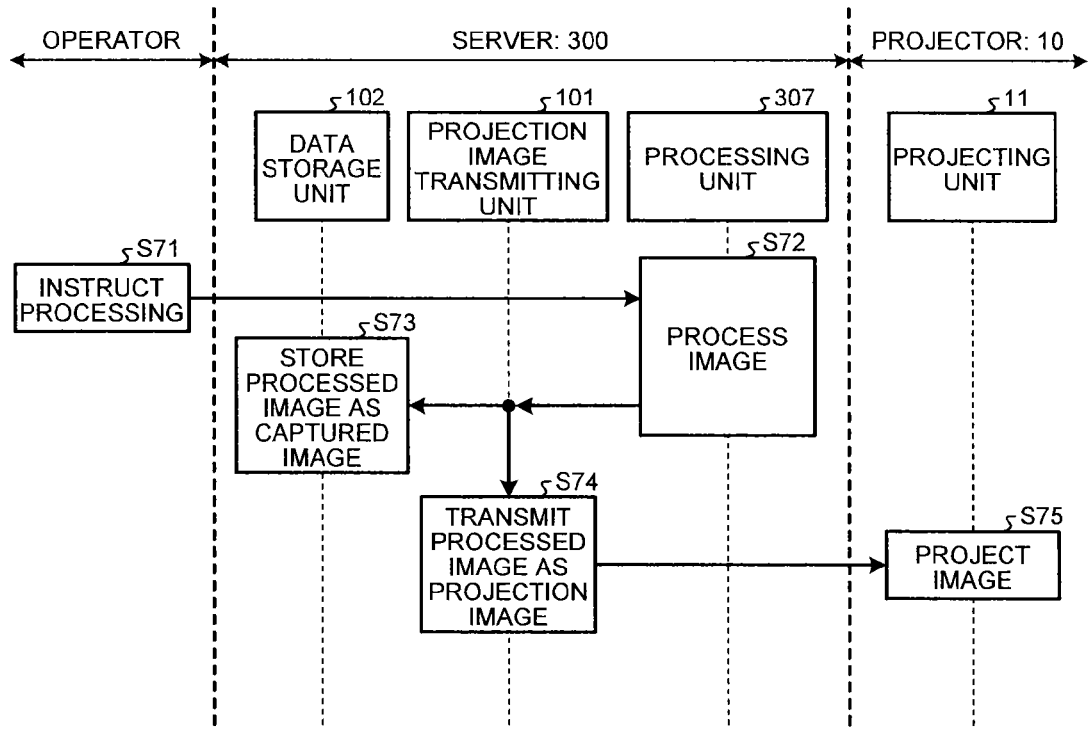
FIG. 17 is a sequence diagram illustrating an example of processing operation in the sixth embodiment.

Subsequently, the operation from the instruction to process a projection image to the projection of the processed image is described with reference to some drawings. FIG. 17 is a sequence diagram illustrating an example of processing operation in the sixth embodiment. As illustrated in FIG. 17, when the participant M1 (operator), for example, among the participants M1 to M4, inputs an instruction to process a projection image through the main terminal device PC1 (Step S71), the processing unit 307 performs processing operation on a projection image being projected by the projecting unit 11 (Step S72). Here, a case where an instruction to process a projection image is input through the main terminal device PC1 is exemplified. However, a configuration may be employed in which the participants M1 to M4 input the instruction through a gesture.

The image processed by the processing unit 307 (processed image) is stored in the data storage unit 102 as a captured image (Step S73), and input to the projection image transmitting unit 101. The projection image transmitting unit 101 transmits the input processed image to the projector 10 as a projection image (Step S74). Then, the projecting unit 11 projects the processed image transmitted to the projector 10 on the white board B1 or the like. (Step S75). Thereafter, the operation after Step S3 in FIG. 3 is performed. Here, the gesture action made by the gesture maker at Step S3 may be a gesture for transmitting the captured image. In such a case, the gesture ID is not input to the image capturing unit 103. Thus, the processes at Steps S7 and S8 in FIG. 3 are omitted, and the captured image transmitted to the gesture maker is replaced with the processed image.

As described above, in the sixth embodiment, a projection image is captured at timing when it is processed. Thus, it is possible to obtain captured images of all processed images even when an image being projected is processed several times. Other configurations, operation, and effects are the same as in any of the embodiments described above. Thus, the detailed descriptions thereof are omitted.

Seventh Embodiment

Next, the information processing apparatus, the conference system, and the conference supporting method according to a seventh embodiment of the invention are described in detail with reference to some drawings. In the following, the same components as in the embodiments described above are denoted by the same symbols, and the overlapped descriptions thereof are omitted.

In the seventh embodiment, a function of determining whether an image being projected is a processed image and switching a captured image to be transmitted depending on the determination result is added in the sixth embodiment. The configuration of the conference system in the seventh embodiment may be the same as in the sixth embodiment. However, the server 300 is substituted by a server 400 illustrated in FIG. 18.

Figure 18:
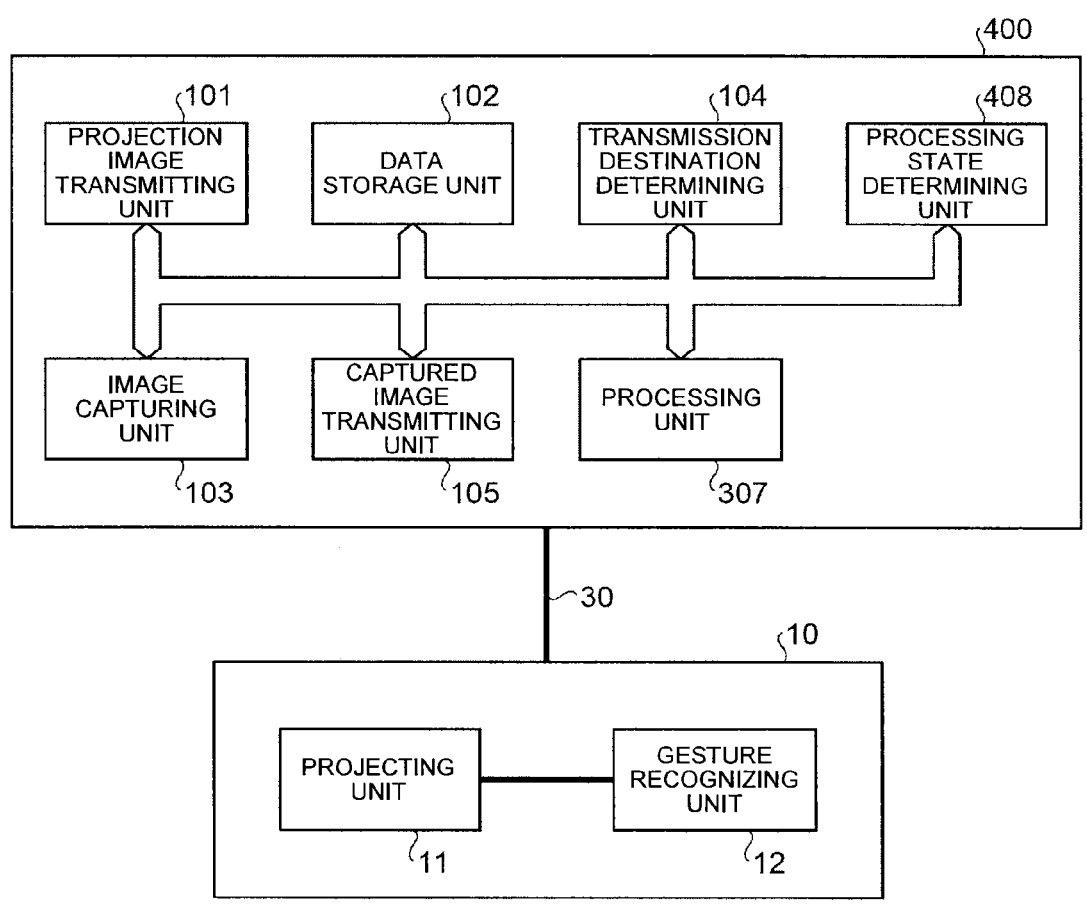
FIG. 18 is a block diagram illustrating schematic configurations of a server and a projector according to a seventh embodiment of the present invention.

As illustrated in FIG. 18, the server 400 includes a processing state determining unit 408 determining a processing state of a projection image being projected by the projecting unit 11, in addition to the same components as of the server 300 illustrated in FIG. 16. The processing state determined by the processing state determining unit 408 includes information of what kind of processing has been performed by the processing unit 307, such as enlargement, reduction, and trimming of an image. The image capturing unit 105 determines, based on the processing state determined by the processing state determining unit 408, whether the image to be captured is set to an image before being processed by the processing unit 307 (original image) or an image after being processed by the processing unit 307 (processed image), and captures the determined image.

Figure 19:
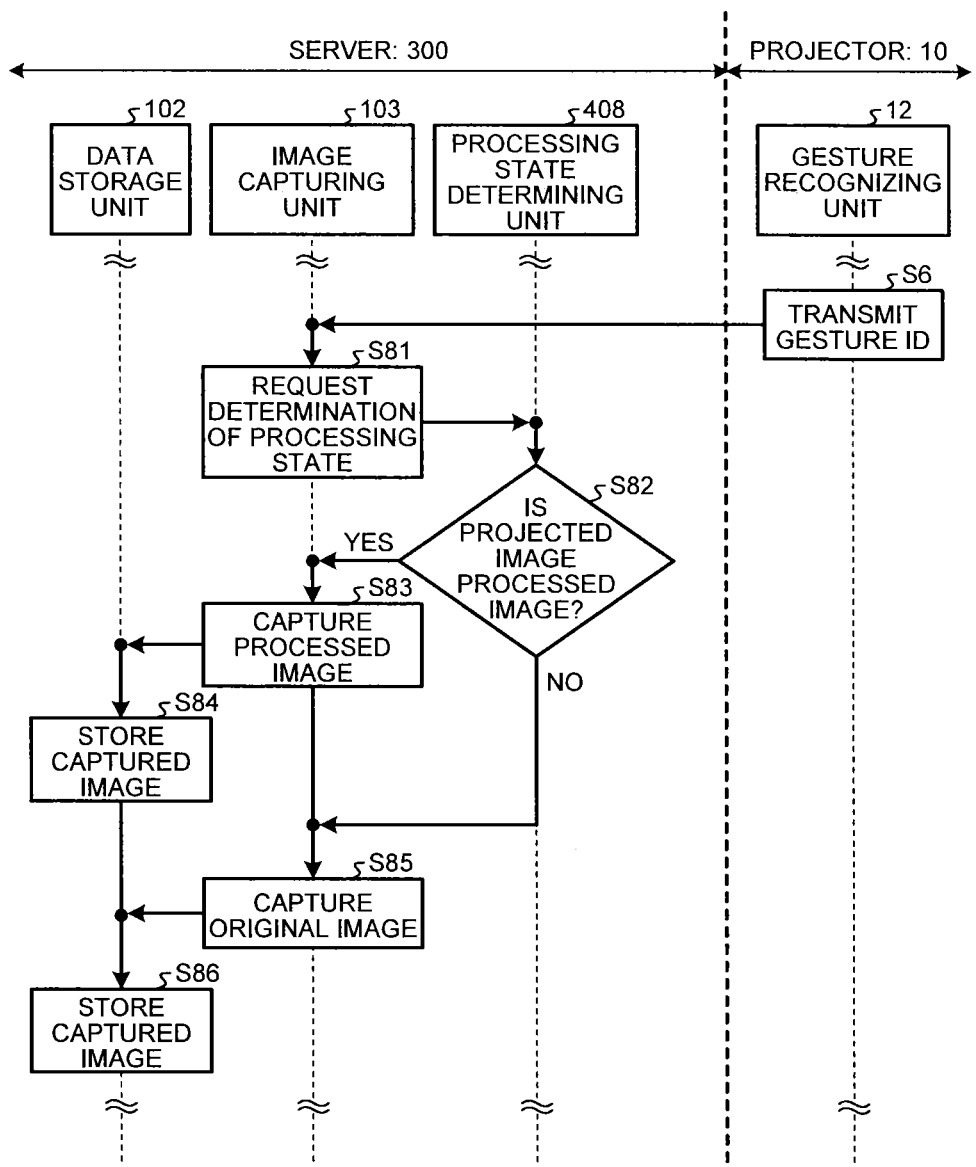
FIG. 19 is a sequence diagram illustrating an example of captured image storing operation in the seventh embodiment.

Subsequently, operation of storing the captured image in the data storage unit 102 (captured image storing operation) performed when a gesture maker inputs an instruction to capture an image through a gesture is described with reference to some drawings. FIG. 19 is a sequence diagram illustrating an example of the captured image storing operation in the seventh embodiment. The other operation may be the same as in the embodiments described above.

That is, in the seventh embodiment, after a processed image is projected by the same operation as at Steps S71 to S75 in FIG. 17, the same operation as at Steps S3 to S6 in FIG. 3 is performed, whereby the gesture ID identifying a gesture made by a gesture maker is transmitted to the server 400, and input to both the image capturing unit 103 and the transmission destination determining unit 104.

Upon input of the gesture ID, the image capturing unit 103 requests the processing state determining unit 408 to determine whether the image being projected is a processed image (Step S81). In response to the request, the processing state determining unit 408 determines whether the image transmitted from the projection image transmitting unit 101 to the projector 10 currently or most recently is an original image or a processed image, and returns the determination result to the image capturing unit 103 (Step S82). When the image being projected is a processed image (Yes at Step S82), the image capturing unit 103 captures the processed image and inputs it to the data storage unit 102 (Step S83), then captures the original image and inputs it to the data storage unit 102 (Step S85). Here, the data storage unit 102 stores therein the captured image of the processed image input at Step S83 and the captured image of the original image input at Step S85 (Steps S84 and S86). By contrast, when the image being projected is not a processed image (No at Step S82), the image capturing unit 103 shifts the operation to Step S85. As a result, only the captured image of the original image is stored in the data storage unit 102 (Step S86).

Thereafter, the operation after Step S9 in FIG. 3 is performed, and thereby the captured image stored in the data storage unit 102 is transmitted to the destination of the gesture maker (Steps S9 to S13).

In the seventh embodiment, when the image being projected is a processed image, both the processed image and the original image are captured and stored. However, the embodiment is not limited thereto. For example, only the processed image may be captured, or the capturing of either one of the processed image or the original image, or the capturing of both of them may be allowed to be specified by a gesture. Moreover, the captured image transmitted to the participants M1 to M4 is not limited to both the processed image and the original image. The captured image of either one of the processed image or the original image may be transmitted, or the transmission of the captured image of either one of the processed image or the original image, or the transmission of both of them may be allowed to be specified by a gesture.

Eighth Embodiment

Next, the information processing apparatus, the conference system, and the conference supporting method according to an eighth embodiment of the invention are described in detail with reference to some drawings. In the following, the same components as in the embodiments described above are denoted by the same symbols, and the overlapped descriptions thereof are omitted.

In the eighth embodiment, the captured image of which transmission is instructed is stored, and once the total data amount of the stored captured images reaches a certain level, the captured images are collectively transmitted.

The configuration of the conference system in the eighth embodiment may be the same as of the conference system 1 illustrated in FIG. 1 or the conference system 2 illustrated in FIG. 10. However, the server 100 is substituted by a server 500 illustrated in FIG. 20.

As illustrated in FIG. 20, the server 500 includes an image size determining unit 509 determining a total data amount of the captured images stored in the data storage unit 102, in addition to the same components as of the server 100 illustrated in FIG. 2. The image size determining unit 509 holds a threshold preliminarily set regarding the total data amount, for example. The threshold may be set or changed dynamically depending on a total capacity or free space of the data storage unit 102. The threshold may be specified by a gesture of the participants M1 to M4.

In the eighth embodiment, the server 500 manages the captured images and the destinations thereof that are stored in the data storage unit 102 in an associated manner. Such association is managed using a destination association table in which image file names of captured images and destinations are associated, as illustrated in FIG. 21, for example. The image file name may include identification information (time stamp, for example) identifying uniquely a captured image, for example. The destination association table is stored in the data storage unit 102, for example.

Figure 22:
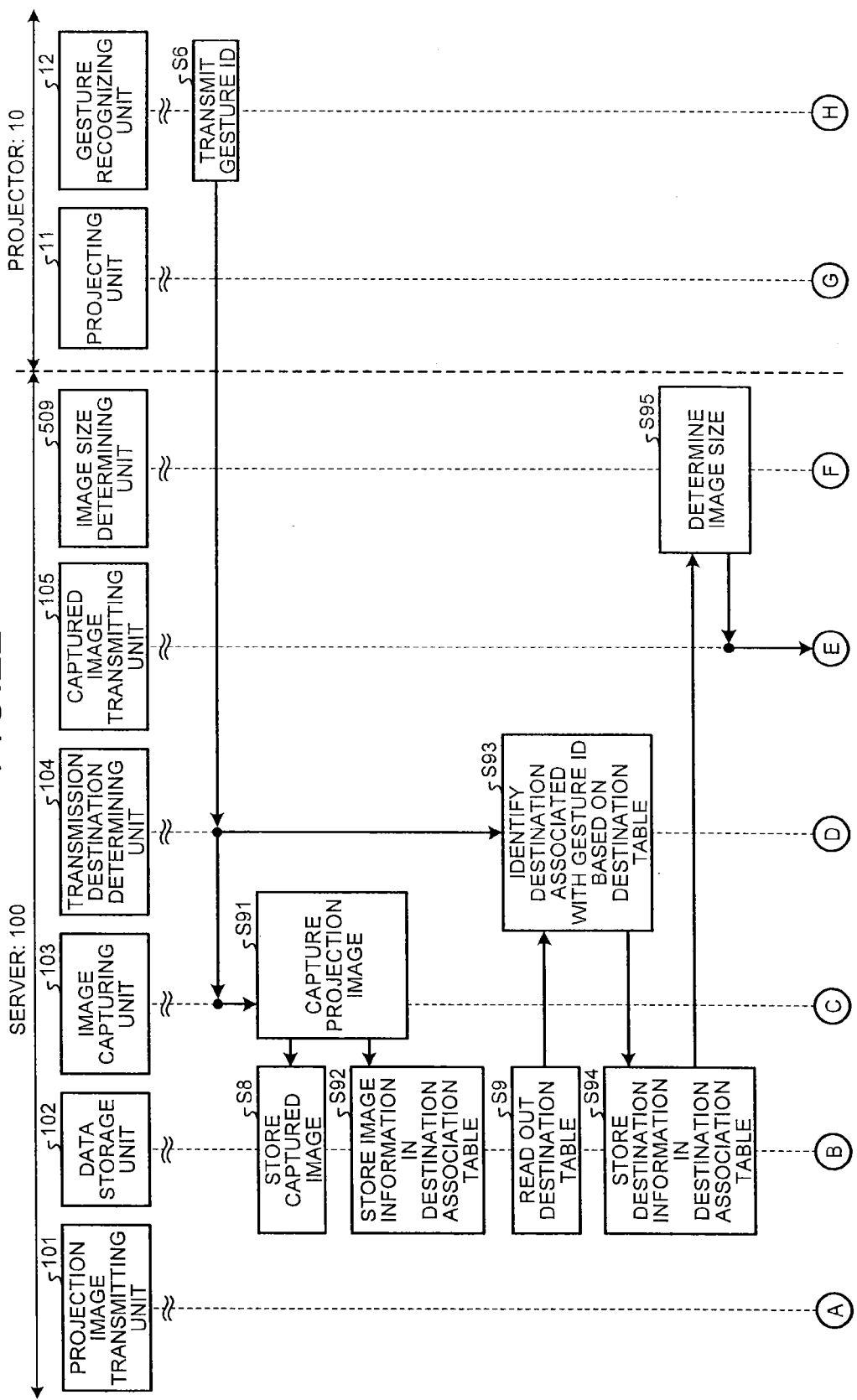
FIG. 22 is a sequence diagram illustrating schematic operation of a conference system in the eighth embodiment (part 1)

Subsequently, the operation of the conference system in the eighth embodiment is described. FIG. 22 and FIG. 23 are sequence diagrams illustrating schematic operation of the conference system in the eighth embodiment. In the operation of the conference system in the eighth embodiment, the processing from the projection of a projection image (Step S1) until the transmission of a gesture ID to the server 500 (Step S6) may be the same as the operation illustrated in FIG. 3.

The gesture ID transmitted from the gesture recognizing unit 12 of the projector 10 (Step S6) is input to the image capturing unit 103 and the transmission destination determining unit 104 of the server 500. Upon input of the gesture ID, the image capturing unit 103 captures a projection image, stores it in the data storage unit 102 (Steps S91 and S8), and registers an image file name of the captured image converted into a file in the destination association table in the data storage unit 102 (Steps S91 and S92).

Upon input of the gesture ID, the transmission destination determining unit 104 reads out a destination table (see FIG. 5) from the data storage unit 102, specifies a destination associated with the gesture ID in the destination table (Steps S10 and S93), and registers the specified destination in association with the image file name registered additionally in the destination association table at Step S92 (Steps S93 and S94).

The image size determining unit 509 calculates a total data amount of the captured images stored in the data storage unit 102 with the storage of a new captured image in the data storage unit 102 as a trigger, and compares the calculated amount with a predetermined threshold to determine an image size (the total data amount of captured images) (Step S95). Then, when the image size exceeds the threshold, the image size determining unit 509 notifies the captured image transmitting unit 105 of this. Upon receiving the notice of the fact that the image size exceeds the threshold, the captured image transmitting unit 105 reads out the destination association table from the data storage unit 102 (Step S99), and determines one or more captured images to be transmitted among the captured images registered in the destination association table (Step S100). Moreover, the captured image transmitting unit 105 reads out the one or more captured images determined to be transmitted, from the data storage unit 102 (Step S101), and collectively transmits the one or more read captured images to the destinations associated with them in the destination association table (Step S102). The read captured images may be deleted from the data storage unit 102 (Step S103).

The captured image stored in the data storage unit 102 may be transmitted at any timing when the participants M1 to M4 request the transmission. In such a case, a gesture maker who is a transmission requester instructs transmission of the stored captured image through a gesture at Step S3 in FIG. 3. Then, the gesture ID identified by the gesture recognizing unit 12 (Step S5) is transmitted to the server 500 (Step S96 in FIG. 23). The gesture ID is input to the transmission destination determining unit 104. Upon input of the gesture ID, the transmission destination determining unit 104 reads out the destination table from the data storage unit 102 (Step S97), and identifies a destination associated with the gesture ID in the destination table (Step S98). The identified destination is input to the captured image transmitting unit 105.

Upon input of the destination from the transmission destination determining unit 104, the captured image transmitting unit 105 reads out the destination association table from the data storage unit 102 (Step S99), and determines one or more captured images associated with the destination among the captured images registered in the destination association table (Step S100). The captured image transmitting unit 105 reads out the one or more captured images determined to be transmitted, from the data storage unit 102 (Step S101), and collectively transmits the one or more read captured images to the destination (Step S102). The read captured images may be deleted from the data storage unit 102 (Step S103).

Here, instead of the configuration in which one or more captured images are collectively transmitted, another configuration in which the captured images are transmitted separately may be employed. In such a case, files are categorized in accordance with attributes of image files of captured images, for example, and transmitted separately for each category. The attributes of files may be information of whether the image has been processed, whether the connection of the projector 10 and the server 500 is of red-green-blue (RGB) or high-definition multimedia interface (HDMI), or of the like.

As described above, in the eighth embodiment, the stored captured images are collectively transmitted. Thus, even when a plurality of captured images are transmitted, it is possible to transmit them with the reduced number of times of communication. Moreover, when a plurality of captured images are transmitted, it is also possible to prevent the failure of transmission due to excessive amount of total data (image size) of the captured images transmitted in one-time transmission processing. Other configurations, operation, and effects are the same as in any of the embodiments described above. Thus, the detailed descriptions thereof are omitted.

In the embodiment described above, the captured image is transmitted at timing when the participants M1 to M4 instruct the transmission through a gesture or at timing when the image size exceeds the threshold. However, the embodiment is not limited thereto. For example, the transmission timing may be allowed to be programmed by a timer (10 minutes later, for example), or specified with time. In such cases, the captured image transmitting unit 105 or the transmission destination determining unit 104 determines one or more captured images to be transmitted using the destination association table and transmits the captured images at timing when the programmed time has passed or at the set time. In this manner, it is possible to specify any transmission timing, and thus transmit captured images while avoiding periods of time with heavy network traffic.

In the embodiments described above, a configuration may be employed in which the participants M1 to M4 can specify, through a gesture, a size (large/medium/small or video graphics array (VGA)/extended graphics array (XGA)/wide extended graphics array (WXGA), for example) or a format (joint photographic experts groups (JPEG), graphics interchange format (GIF), bitmap, portable document format (PDF), PowerPoint, or Word, for example) of a file of a captured image generated by the image capturing unit 103. In such a case, it is possible to specify any image size or format, and thus provide the participants with the captured images not only in a size or format stored in the server but also in a specified size or format.

Moreover, in the embodiments described above, a configuration may be employed in which a participant can transmit a captured image to a destination other than the participant himself/herself. It is preferable that the destination can be appropriately specified by a gesture.

The embodiment makes it possible to receive an instruction by a participant who does not have an operation terminal through which a projector or a server can be accessed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus connected to a projecting unit that projects an image and a gesture recognizing unit that recognizes a gesture by a person, the information processing apparatus comprising:
   a projection image transmitting unit that inputs a projection image to the projecting unit;
   an image capturing unit that captures, when the gesture recognizing unit has recognized a gesture, a projection image being projected by the projecting unit;
   a transmission destination determining unit that determines a transmission destination address based on a gesture recognized by the gesture recognizing unit; and
   a captured image transmitting unit that transmits a captured image captured by the image capturing unit to a transmission destination address determined by the transmission destination determining unit, wherein the information processing apparatus further comprises
   a storage unit that stores therein a destination table that stores a gesture by a person and a transmission destination address in an associated manner, wherein
   the transmission destination determining unit determines a transmission destination address associated with the gesture recognized by the gesture recognizing unit based on the destination table.

2. The information processing apparatus according to claim 1, wherein the transmission destination determining unit determines, when no transmission destination address is associated with a gesture recognized by the gesture recognizing unit in the destination table, a predetermined address as a transmission destination address.

3. The information processing apparatus according to claim 1, further comprising:
   an authenticating unit that authenticates a user; and
   a destination table generating unit that adds an address of a user authenticated by the authenticating unit to the destination table.

4. The information processing apparatus according to claim 1, further comprising:
   a processing unit that processes an image being projected by the projecting unit, wherein
   the image capturing unit captures an image processed by the processing unit, and
   the projecting unit projects an image processed by the processing unit.

5. The information processing apparatus according to claim 4, further comprising:
   a processing state determining unit that determines whether an image being projected by the projecting unit is an image processed by the processing unit, wherein
   the image capturing unit captures both an image processed by the processing unit and an image before being processed by the processing unit when the image being projected by the projecting unit is the image processed by the processing unit, and
   the captured image transmitting unit transmits at least one of a captured image of the image after being processed and a captured image of the image before being processed that are captured by the image capturing unit to the transmission destination address when the image being projected by the projecting unit is the image processed by the processing unit.

6. An information processing apparatus connected to a projecting unit that projects an image and a gesture recognizing unit that recognizes a gesture by a person, the information processing apparatus comprising:
   a projection image transmitting unit that inputs a projection image to the projecting unit;
   an image capturing unit that captures, when the gesture recognizing unit has recognized a gesture, a projection image being projected by the projecting unit;
   a transmission destination determining unit that determines a transmission destination address based on a gesture recognized by the gesture recognizing unit; and
   a captured image transmitting unit that transmits a captured image captured by the image capturing unit to a transmission destination address determined by the transmission destination determining unit, wherein the information processing apparatus further comprises:
   a storage unit that stores therein a gesture association table that stores gestures by a person and character codes in an associated manner, wherein
   the transmission destination determining unit determines a transmission destination address based on an array of character codes associated with gestures recognized by the gesture recognizing unit.

7. An information processing apparatus connected to a projecting unit that projects an image and a gesture recognizing unit that recognizes a gesture by a person, the information processing apparatus comprising:
   a projection image transmitting unit that inputs a projection image to the projecting unit;
   an image capturing unit that captures, when the gesture recognizing unit has recognized a gesture, a projection image being projected by the projecting unit;
   a transmission destination determining unit that determines a transmission destination address based on a gesture recognized by the gesture recognizing unit; and a captured image transmitting unit that transmits a captured image captured by the image capturing unit to a transmission destination address determined by the transmission destination determining unit, wherein the information processing apparatus further comprises:

a storage unit that stores therein a destination association table that stores an association relation between transmission destination addresses and captured images, wherein the captured image transmitting unit collectively transmits, when a total data amount of unsent captured images captured by the image capturing unit exceeds a threshold, one or more captured images associated with a transmission destination address determined by the transmission destination determining unit in the destination association table among the unsent captured images.

8. A conference system, comprising:

a projecting unit that projects an image;

a projection image transmitting unit that inputs a projection image to the projecting unit;

a gesture recognizing unit that recognizes a gesture by a person;

an image capturing unit that captures, when the gesture recognizing unit has recognized a gesture, a projection image being projected by the projecting unit;

a transmission destination determining unit that determines a transmission destination address based on a gesture recognized by the gesture recognizing unit; and a captured image transmitting unit that transmits a captured image captured by the image capturing unit to a transmission destination address determined by the transmission destination determining unit, wherein the conference system further comprises a storage unit that stores therein a destination table that stores a gesture by a person and a transmission destination address in an associated manner, and the transmission destination determining unit determines a transmission destination address associated with the gesture recognized by the gesture recognizing unit based on the destination table.

9. The conference system according to claim 8, wherein the transmission destination determining unit determines, when no transmission destination address is associated with a gesture recognized by the gesture recognizing unit in the destination table, a predetermined address as a transmission destination address.

10. The conference system according to claim 8, further comprising:

an authenticating unit that authenticates a user; and a destination table generating unit that adds an address of a user authenticated by the authenticating unit to the destination table.

11. The conference system according to claim 8, further comprising:

a processing unit that processes an image being projected by the projecting unit, wherein the image capturing unit captures an image processed by the processing unit, and the projecting unit projects an image processed by the processing unit.

12. The conference system according to claim 11, further comprising:

a processing state determining unit that determines whether an image being projected by the projecting unit is an image processed by the processing unit, wherein the image capturing unit captures both an image processed by the processing unit and an image before being processed by the processing unit when the image being projected by the projecting unit is the image processed by the processing unit, and the captured image transmitting unit transmits at least one of a captured image of the image after being processed and a captured image of the image before being processed that are captured by the image capturing unit to the transmission destination address when the image being projected by the projecting unit is the image processed by the processing unit.

13. A conference system, comprising:

a projecting unit that projects an image;

a projection image transmitting unit that inputs a projection image to the projecting unit;

a gesture recognizing unit that recognizes a gesture by a person;

an image capturing unit that captures, when the gesture recognizing unit has recognized a gesture, a projection image being projected by the projecting unit;

a transmission destination determining unit that determines a transmission destination address based on a gesture recognized by the gesture recognizing unit; and a captured image transmitting unit that transmits a captured image captured by the image capturing unit to a transmission destination address determined by the transmission destination determining unit, wherein the conference system further comprises:

a storage unit that stores therein a gesture association table that stores gestures by a person and character codes in an associated manner, wherein the transmission destination determining unit determines a transmission destination address based on an array of character codes associated with gestures recognized by the gesture recognizing unit.

14. A conference system, comprising:

a projecting unit that projects an image;

a projection image transmitting unit that inputs a projection image to the projecting unit;

a gesture recognizing unit that recognizes a gesture by a person;

an image capturing unit that captures, when the gesture recognizing unit has recognized a gesture, a projection image being projected by the projecting unit;

a transmission destination determining unit that determines a transmission destination address based on a gesture recognized by the gesture recognizing unit; and a captured image transmitting unit that transmits a captured image captured by the image capturing unit to a transmission destination address determined by the transmission destination determining unit, wherein the conference system further comprises:

a storage unit that stores therein a destination association table that stores an association relation between transmission destination addresses and captured images, wherein the captured image transmitting unit collectively transmits, when a total data amount of unsent captured images captured by the image capturing unit exceeds a threshold, one or more captured images associated with a transmission destination address determined by the transmission destination determining unit in the destination association table among the unsent captured images.

15. A conference supporting method, comprising:
projecting an image;
inputting a projection image projected at the projecting;
recognizing a gesture by a person;
capturing, when a gesture has been recognized at the recognizing, a projection image being projected at the projecting;
determining a transmission destination address based on a gesture recognized at the recognizing; and
transmitting a captured image captured at the capturing to a transmission destination address determined at the determining,
wherein the determining step comprises determining the transmission destination address by determining a destination address associated with the gesture recognized in the recognizing step within a destination table stored in a memory, the destination table storing a gesture made by a person in association with a destination address.

* * * * *